June 13, 1961 R. R. EVERETT ET AL 2,988,735

MAGNETIC DATA STORAGE

Filed March 17, 1955 20 Sheets-Sheet 1

June 13, 1961 R. R. EVERETT ET AL 2,988,735

MAGNETIC DATA STORAGE

Filed March 17, 1955 20 Sheets-Sheet 3

June 13, 1961 R. R. EVERETT ET AL 2,988,735

MAGNETIC DATA STORAGE

Filed March 17, 1955 20 Sheets-Sheet 4

June 13, 1961 R. R. EVERETT ET AL 2,988,735

MAGNETIC DATA STORAGE

Filed March 17, 1955 20 Sheets-Sheet 5

June 13, 1961 R. R. EVERETT ET AL 2,988,735

MAGNETIC DATA STORAGE

Filed March 17, 1955 20 Sheets-Sheet 6

June 13, 1961 R. R. EVERETT ET AL 2,988,735

MAGNETIC DATA STORAGE

Filed March 17, 1955 20 Sheets-Sheet 7

June 13, 1961 R. R. EVERETT ET AL 2,988,735

MAGNETIC DATA STORAGE

Filed March 17, 1955 20 Sheets-Sheet 8

TIMING CIRCUIT

June 13, 1961 R. R. EVERETT ET AL 2,988,735

MAGNETIC DATA STORAGE

Filed March 17, 1955 20 Sheets-Sheet 9

June 13, 1961 R. R. EVERETT ET AL 2,988,735

MAGNETIC DATA STORAGE

Filed March 17, 1955 20 Sheets-Sheet 12

June 13, 1961 R. R. EVERETT ET AL 2,988,735

MAGNETIC DATA STORAGE

Filed March 17, 1955

20 Sheets-Sheet 13

June 13, 1961 R. R. EVERETT ET AL 2,988,735

MAGNETIC DATA STORAGE

Filed March 17, 1955 20 Sheets-Sheet 14

June 13, 1961 R. R. EVERETT ET AL 2,988,735

MAGNETIC DATA STORAGE

Filed March 17, 1955

20 Sheets-Sheet 15

June 13, 1961 R. R. EVERETT ET AL 2,988,735

MAGNETIC DATA STORAGE

Filed March 17, 1955 20 Sheets-Sheet 16

June 13, 1961

R. R. EVERETT ET AL 2,988,735

MAGNETIC DATA STORAGE

Filed March 17, 1955

20 Sheets-Sheet 18

United States Patent Office 2,988,735

Patented June 13, 1961

2,988,735

MAGNETIC DATA STORAGE

Robert R. Everett, Reading, Mass., and Robert L. Walquist, Palos Verdes Estates, Calif., assignors, by direct and mesne assignments, to Research Corporation, New York, N.Y., a corporation of New York Filed Mar. 17, 1955, Ser. No. 494,982
10 Claims. (Cl. 340—174.1)

This invention relates to data signal transmission systems and more particularly to digital data signal transmission systems employing magnetic drum storage.

In certain types of data signal transmission systems, it is oftentimes desirable to incorporate in the transmission system a time buffer such as, for example, a magnetic drum storage device. A time buffer in a data transmission system permits a high speed data source and a low speed data receiver or a low speed data source and a high speed data receiver to be interconnected.

Magnetic drum storage systems heretofore had an average access time to store or read data which was equal to one-half a drum revolution or even longer. In the magnetic drum storage system herein described, the average access time for storing information on the drum is a function of the empty or full status of the registers on the drum and the probability of substantially immediate access to the drum is very high provided that stored data is removed from the drum at a reasonable rate. The average access time for reading information from the drum of the storage system herein described is also a function of the empty or full status of the registers on the drum. The magnetic drum storage system herein described is particularly useful as a time buffer between a data source and data load in which the data source has a data rate varying from an extremely high rate to an extremely low rate. However, over relatively long periods of time the average data rate is uniform.

Briefly stated, in accordance with the principles of this invention, the magnetic drum storage device includes status channels which produce signals indicating whether or not the drum register which is next to be available for writing into or reading from is empty or full and these signals actuate suitable control circuits in order that when a word of data is applied to the transmission system it will be written into the first empty drum register which comes under the drum writing heads and if a drum register is full and the data receiver has asked for data, the signals stored therein will be delivered to the data receiver.

An object of this invention is to provide an improved magnetic drum system of the buffer type.

A further object of this invention is to provide an improved signal transmission system which employs magnetic drum storage having almost immediate access for recording data thereon and high speed access for reading data therefrom.

Another object of this invention is to provide an improved magnetic drum data storage system which employs status control whereby data will be stored in the first empty register, which is available to the drum writing circuit, following the time that the data is available.

A still further object of this invention is to provide an improved magnetic drum data storage system for storing data from a plurality of data sources, together with identification signals indicating which data source the particular data originated from in the first empty register which is available to the drum writing circuit following the time that the data is available.

Still another object of this invention is to provide an improved magnetic drum data storage system for storing data from a plurality of data sources, together with identification signals indicating which data source the particular data originated from, by means of a status control circuit including magnetically recorded status signals on the drum indicating the full or empty status of each of the drum registers so that writing operations only take place in empty registers, reading operations are only performed on full registers and it is not necessary to erase a register after the data stored therein is of no further value.

Another and further object of this invention is to provide an improved magnetic drum data storage system employing a writing circuit that insures that when power is turned on to the system, the writing heads will not be so energized as to erase useful data stored on the drum.

Another and still further object of this invention is to provide an improved magnetic drum data storage system employing a time pulse generator which receives signals in the form of a sine wave from the drum which identify drum register locations and from this sine wave signal, accurately timed pulses are generated.

Another object of this invention is to provide an improved magnetic drum data storage system employing a time pulse generator in which inter-cathode capacitive coupling is used between amplifying circuits whereby variations in signal input do not materially affect its operation.

Other objects of the invention will be pointed out in the following description and claims and illustrated in the accompanying drawings, which disclose, by way of example, the principle of the invention and the best mode, which has been contemplated, of applying that principle.

FIGURES 10*a* to 10*d* are a family of curves illustrating the timing relationship of input and output signals of the Read Circuits used in the apparatus herein described.

Figure 1:
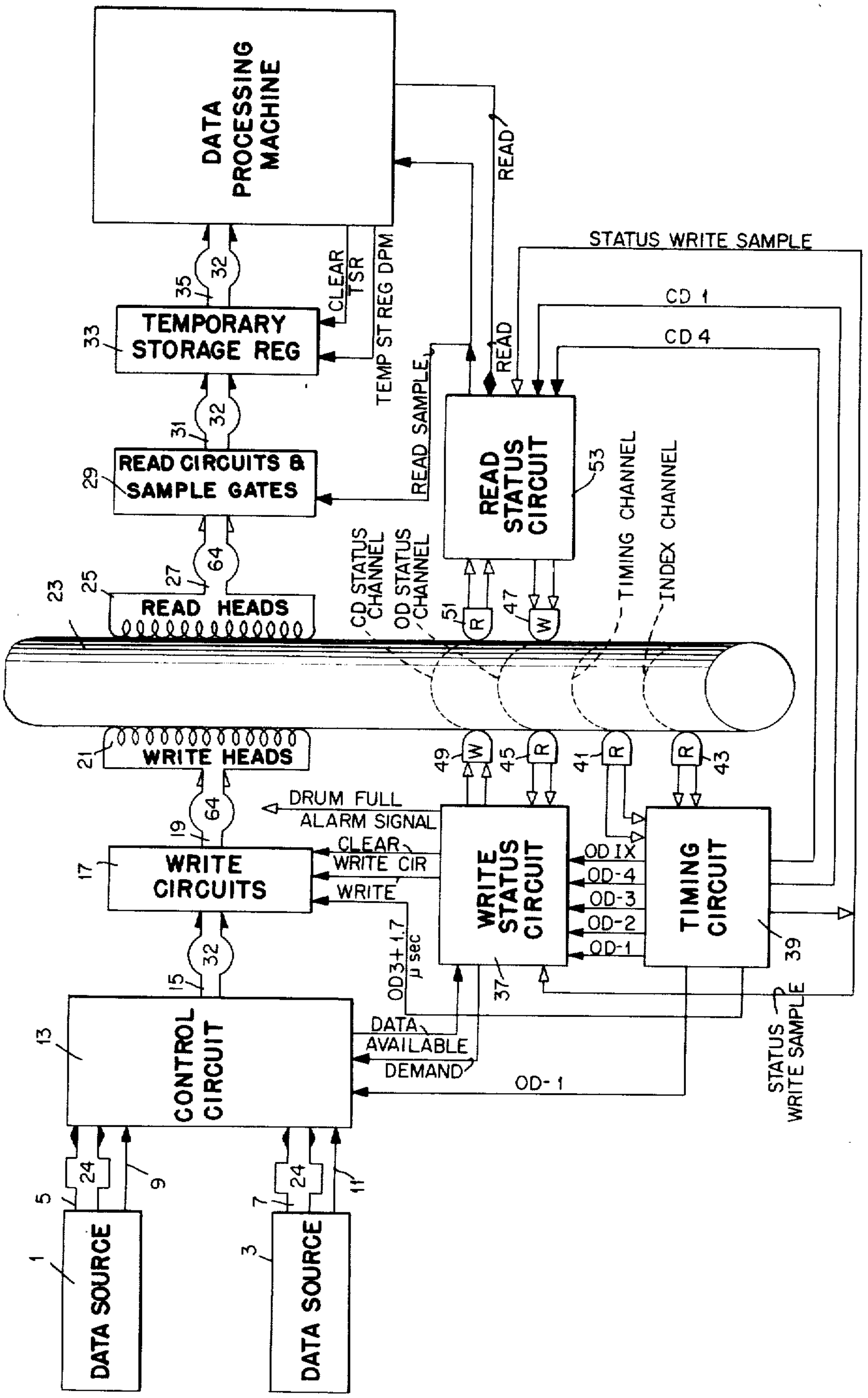
FIGURE 1 is a simplified block diagram of a preferred embodiment of a data signal transmission system constructed in accordance with the principles of this invention.
Figure 11:
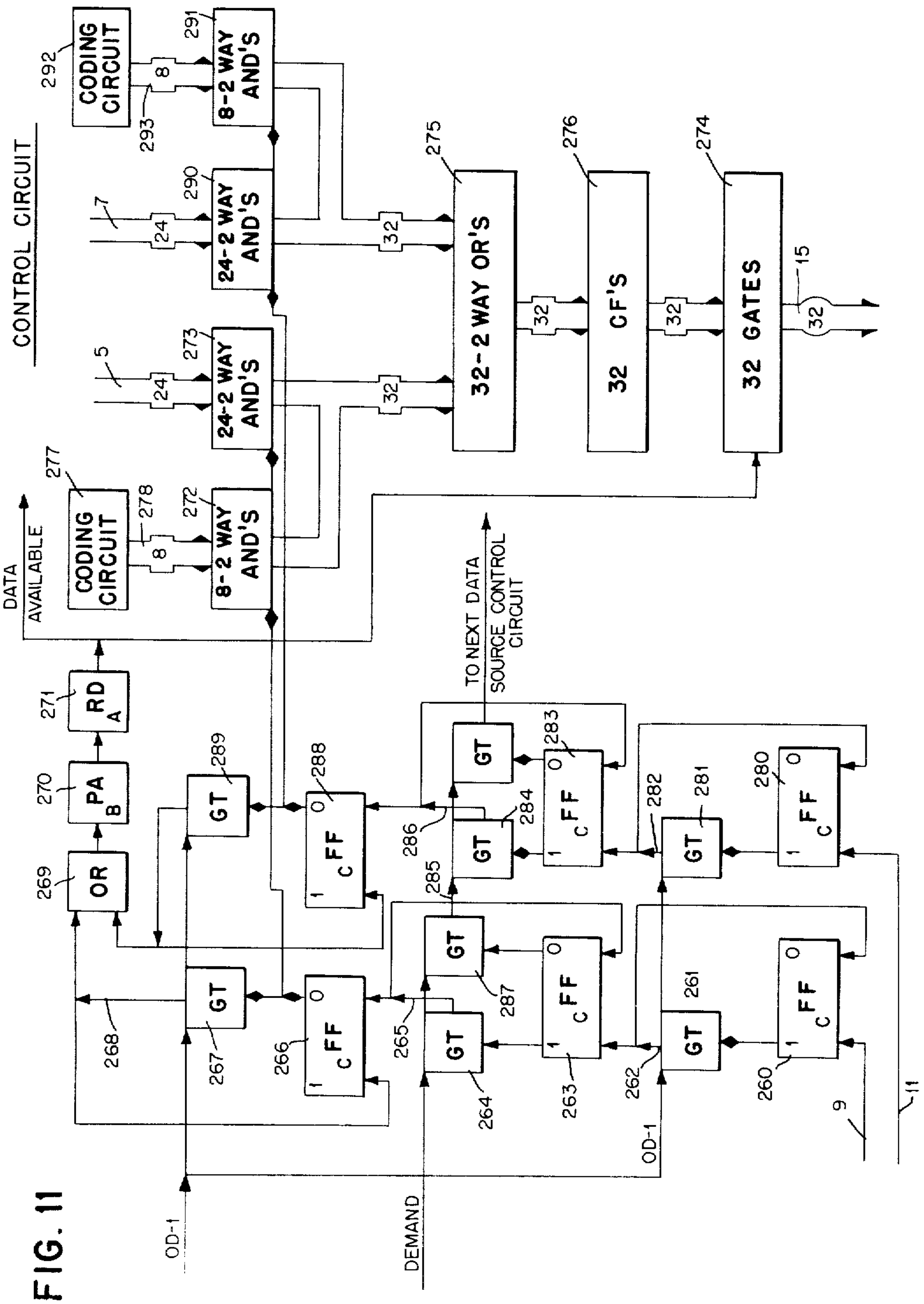

FIGURE 11 is a logical block diagram of the Control Circuit indicated as block 13 in FIG. 1.

Figure 12:
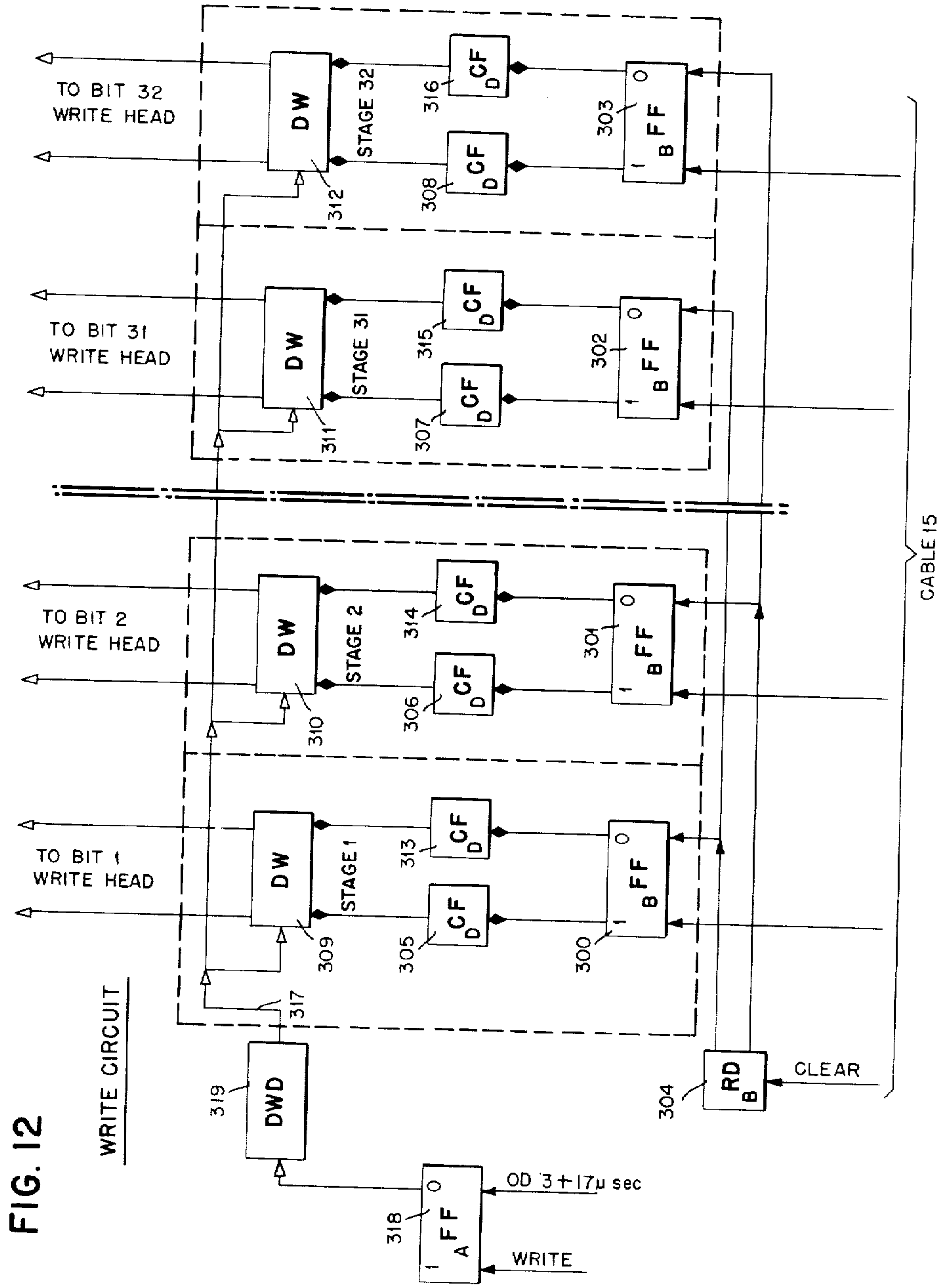

FIGURE 12 is a logical block diagram of the Write Circuits indicated as block 17 in FIG. 1.

Figures 13, 14:
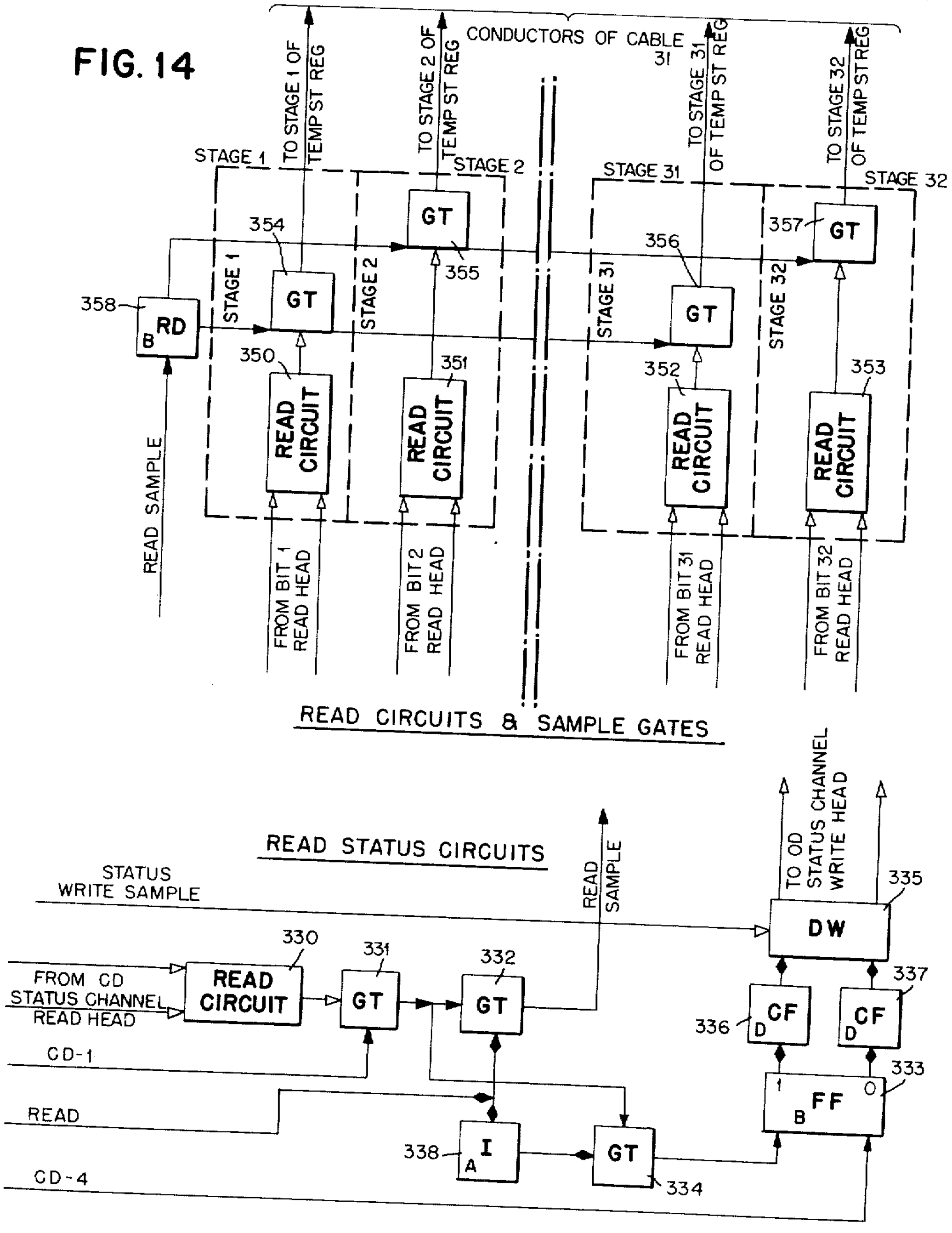

FIGURE 13 is a logical block diagram of the Read Status Circuit indicated as block 53 in FIG. 1.

FIGURE 14 is a logical block diagram of the Read Circuits and Sample Gates indicated as block 29 in FIG. 1.

Figure 15:
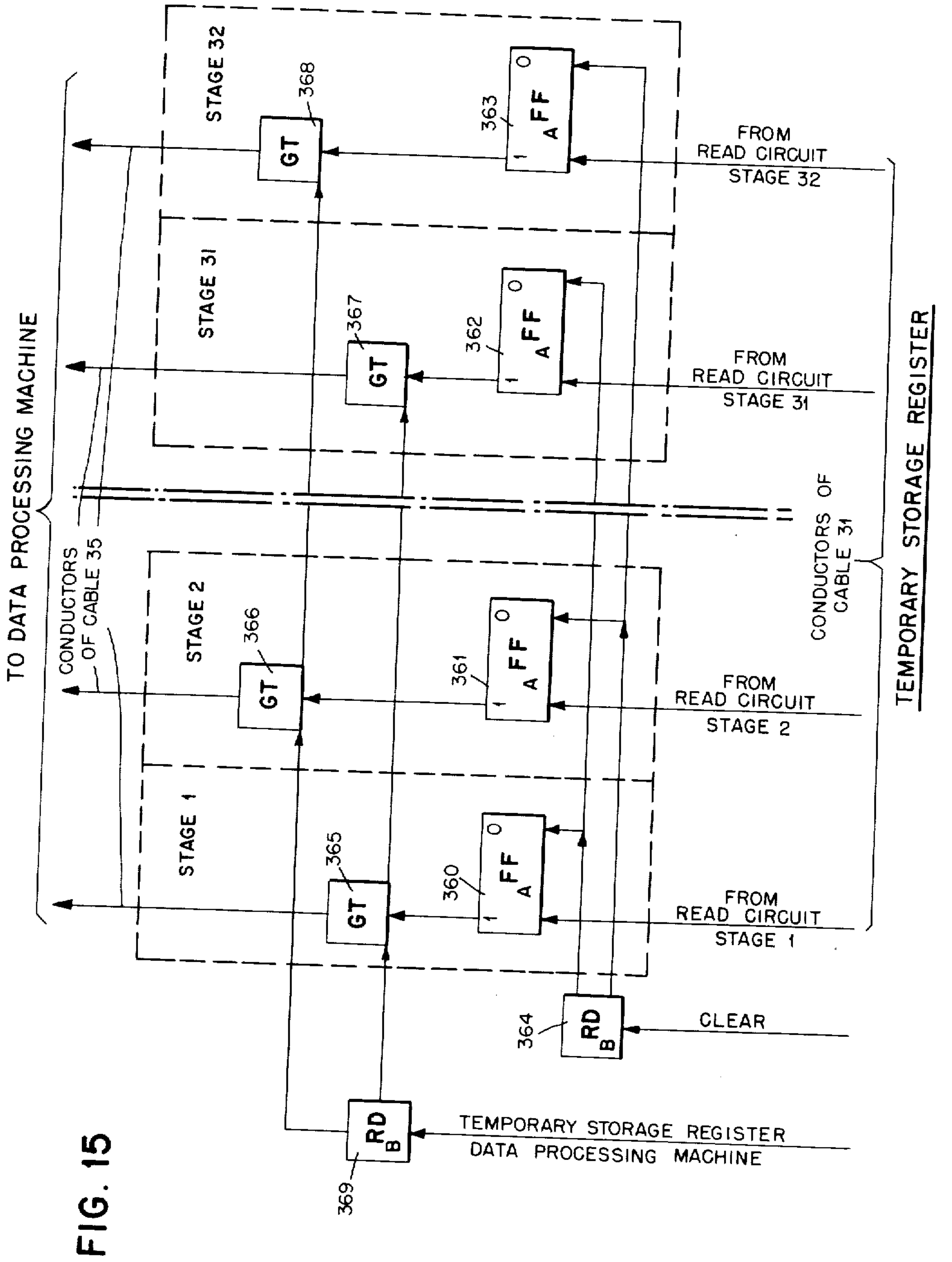

FIGURE 15 is a logical block diagram of the Temporary Storage Register indicated as block 33 in FIG. 1.

Figure 8:
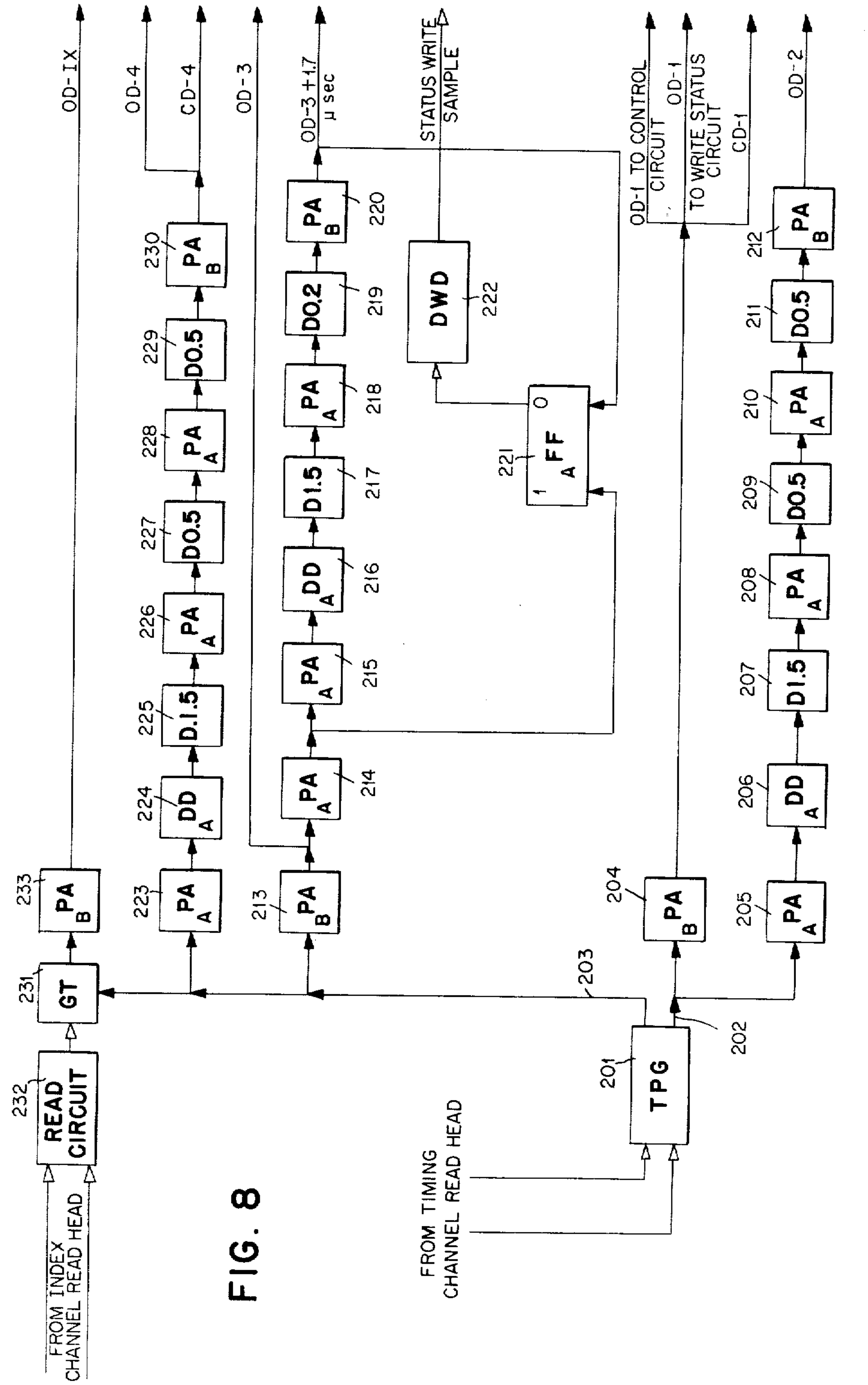
FIGURE 8 is a logical block diagram of the timing circuit indicated as block 39 in FIG. 1.
Figure 16:
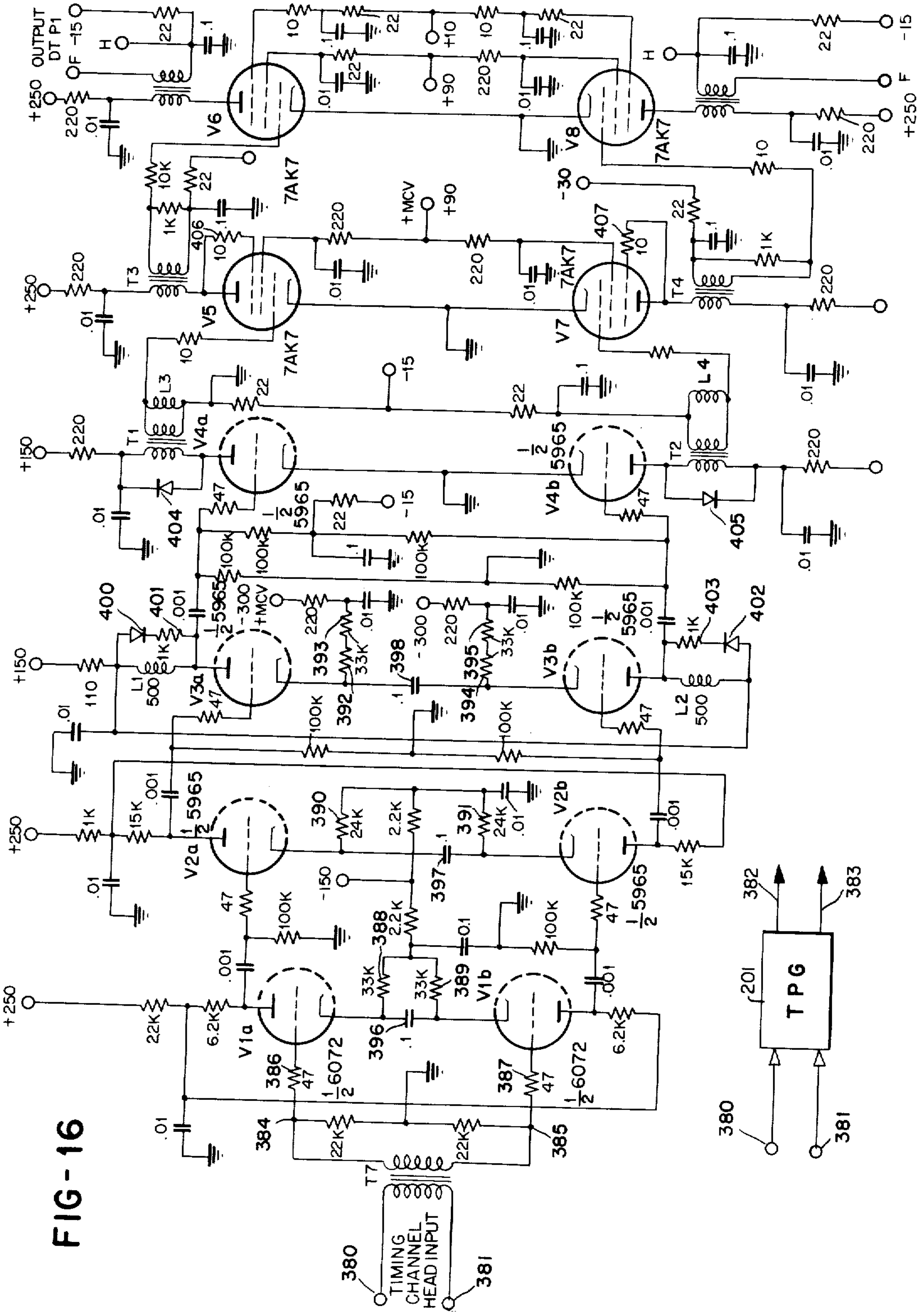

FIGURE 16 is a schematic wiring diagram and block symbol of the Timing Pulse Generator indicated as block 201 in FIG. 8.

Figure 17:
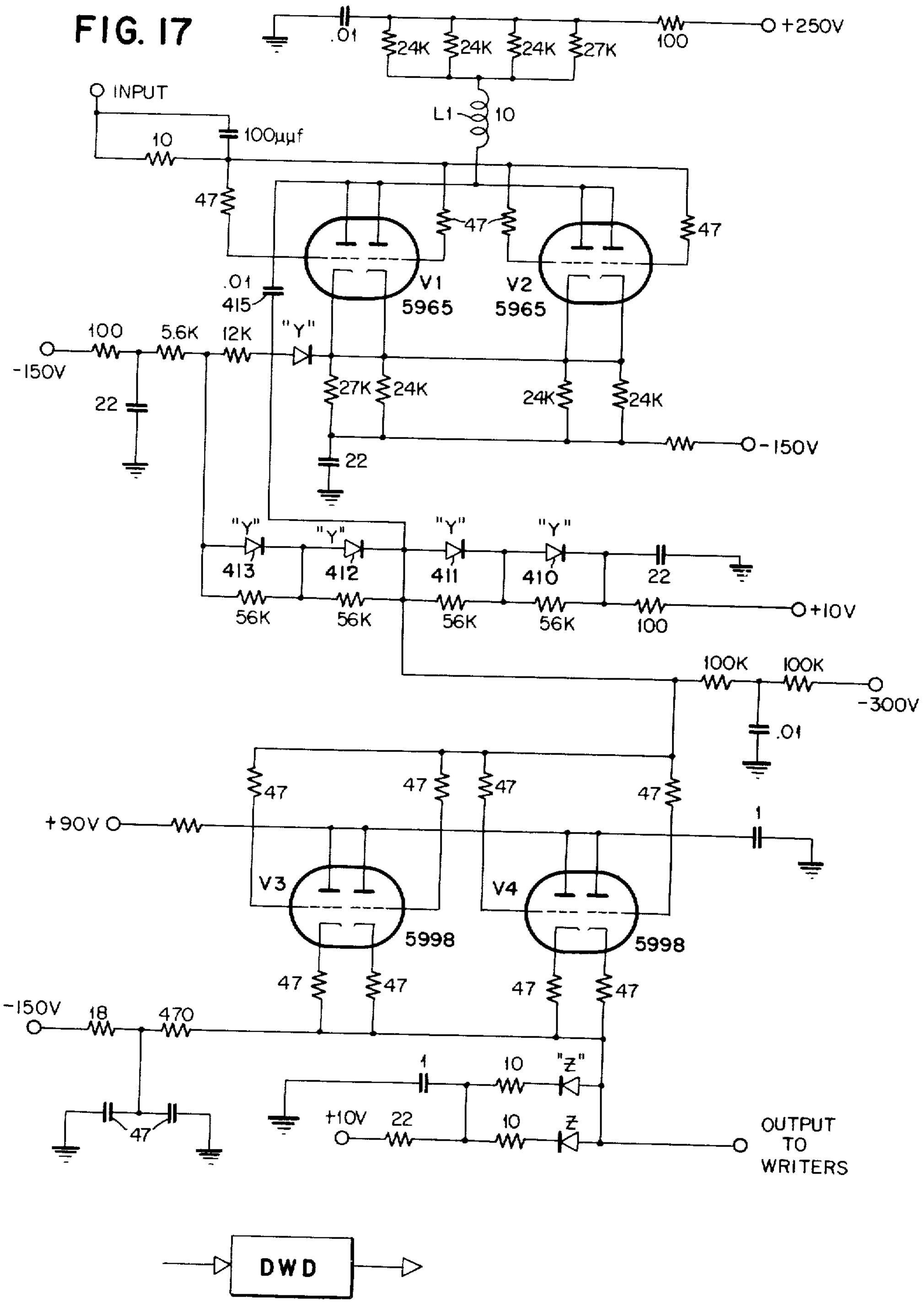

FIGURE 17 is a schematic wiring diagram and block symbol of the Drum Write Driver which is indicated by block symbol DWD in FIG. 8 and block symbol 319 in FIG. 12.

Figure 9:
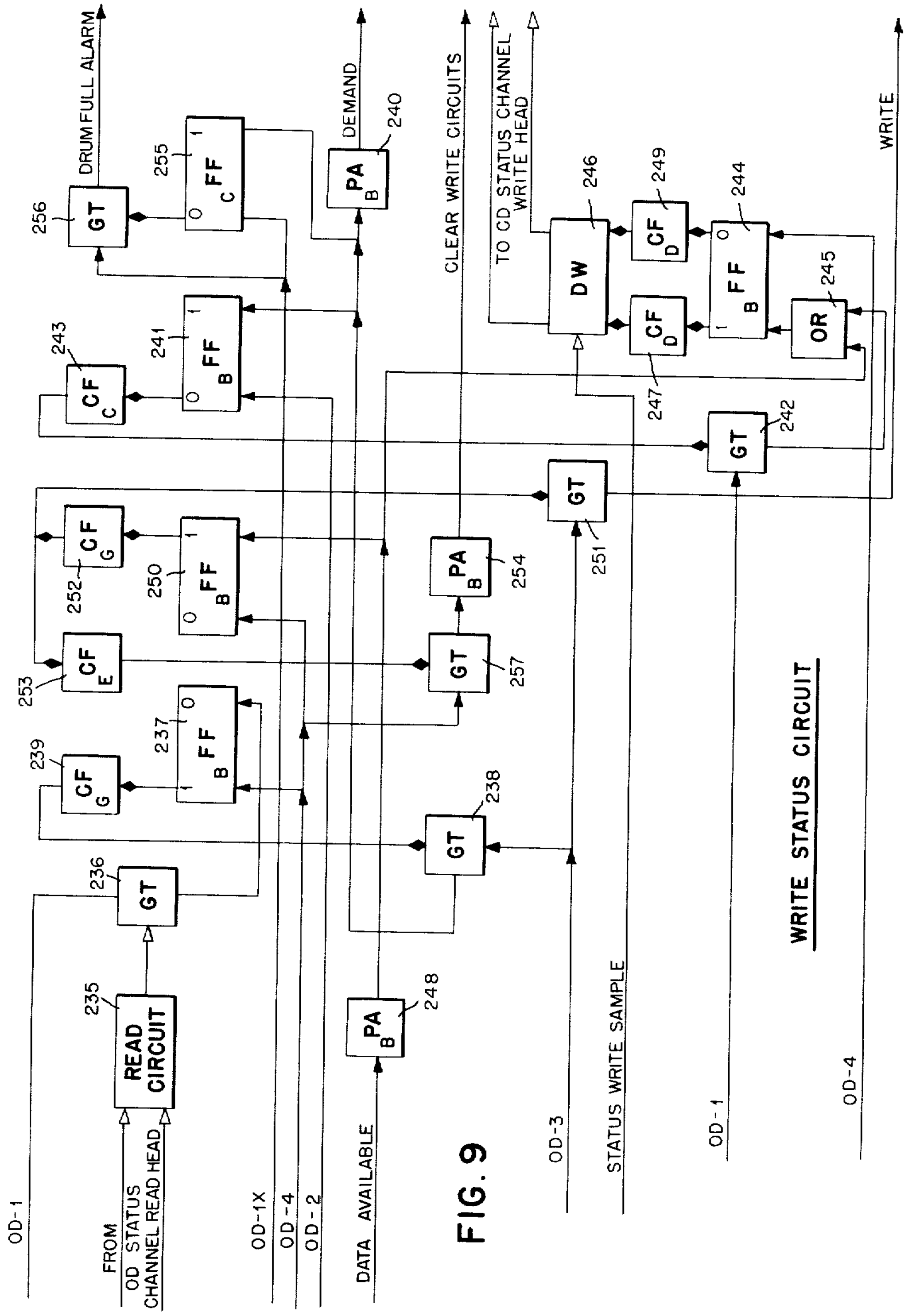
FIGURE 9 is a logical block diagram of the Write Status circuit indicated as block 37 in FIG. 1.
Figures 10A, 10B:
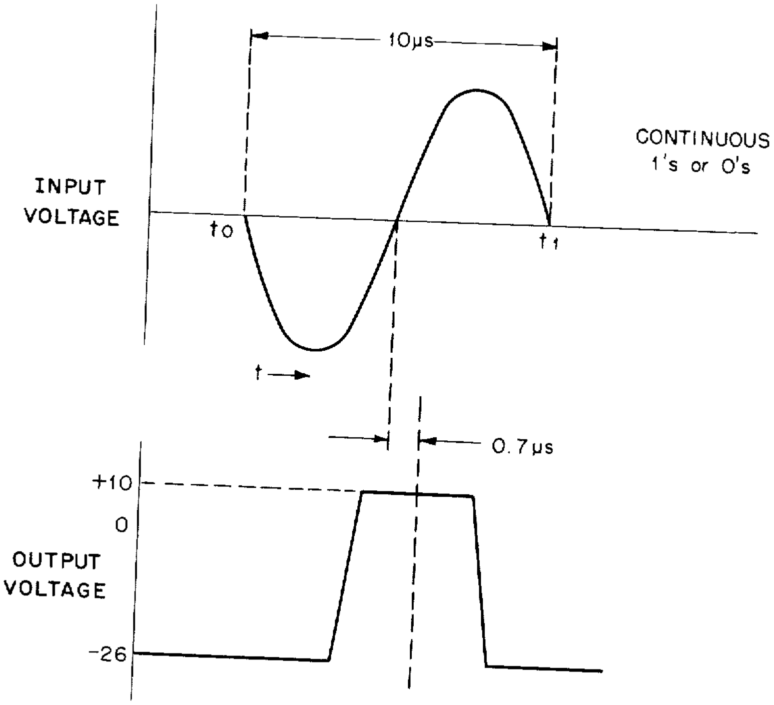
Figures 10C, 10D:
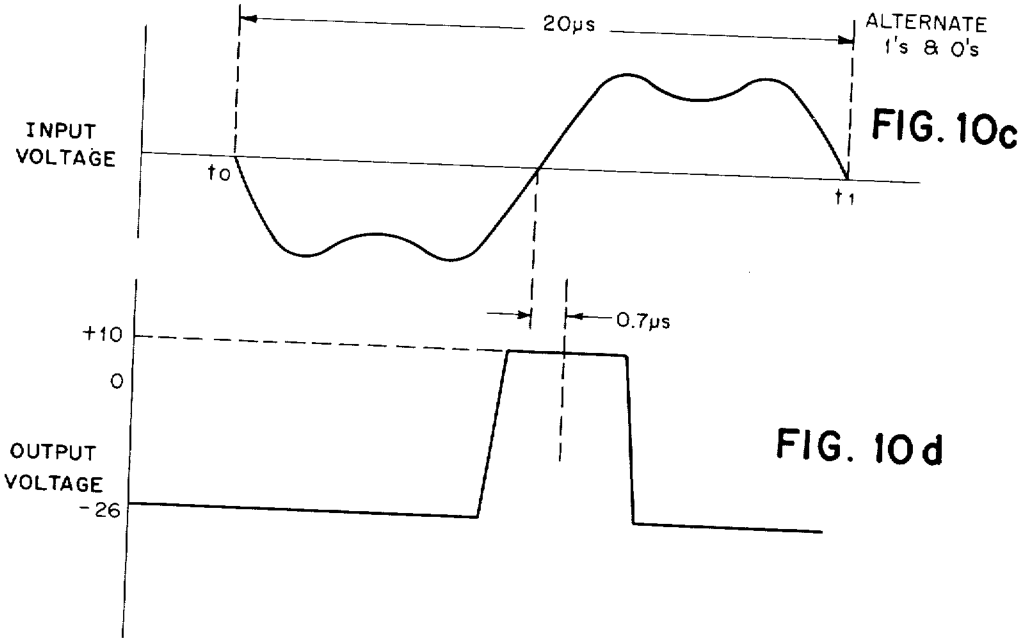
Figure 18:
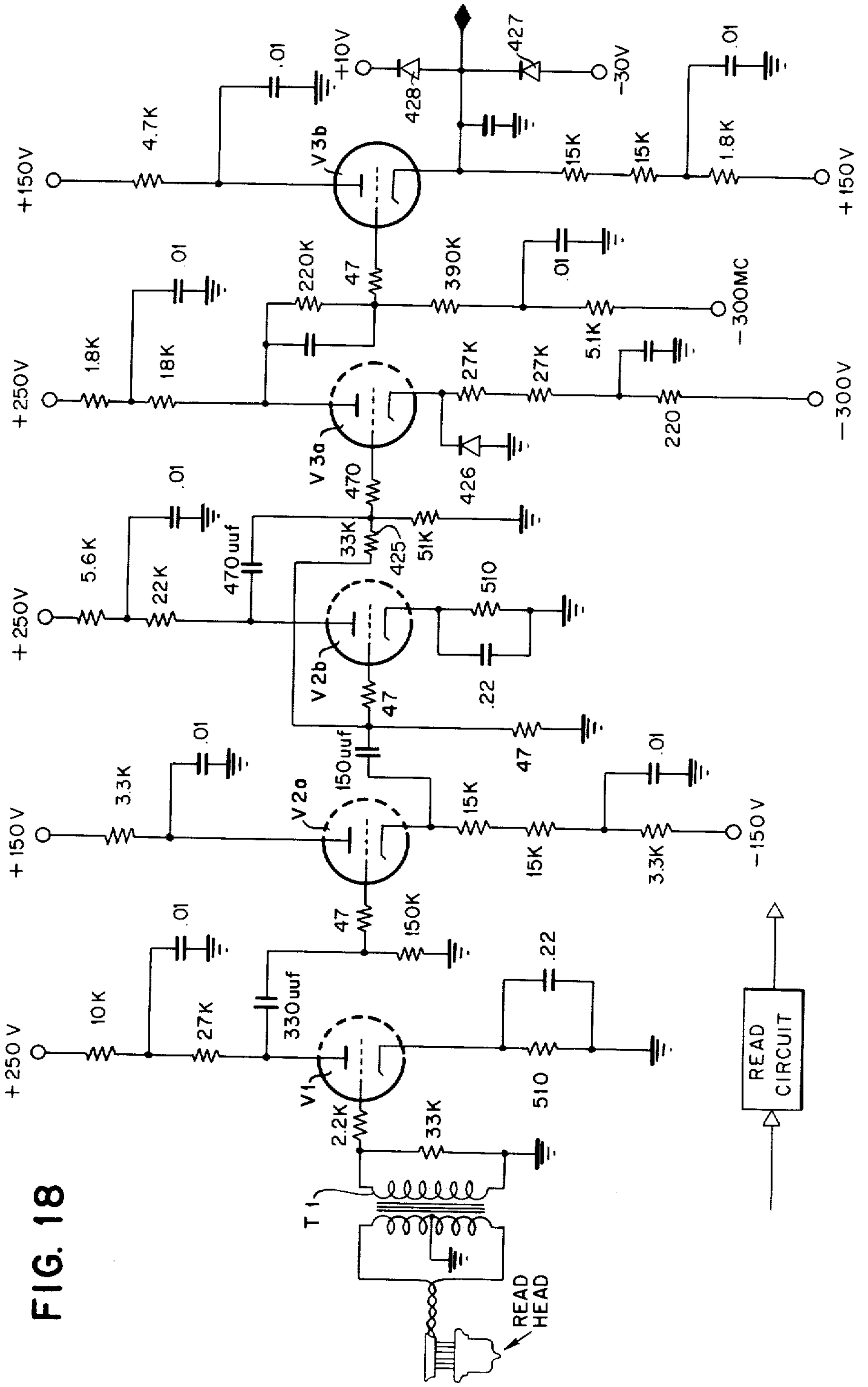

FIGURE 18 is a wiring schematic diagram of the Read Circuit indicated by block symbol 232 in FIG. 8, by block symbol 235 in FIG. 9, by block symbol 330 in FIG. 13 and by block symbols 350 through 353 in FIG. 14.

Figure 19:
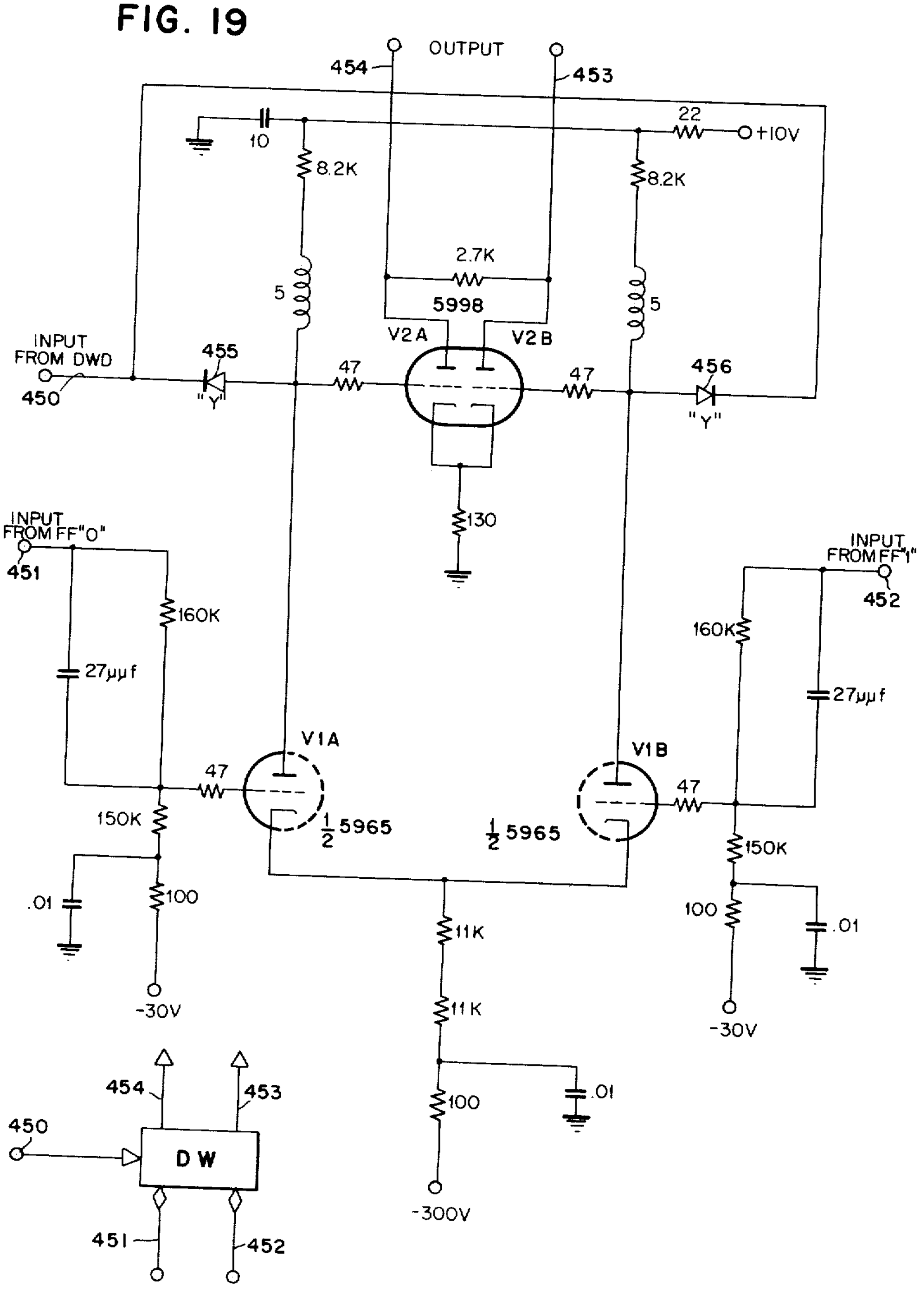

FIGURE 19 is a wiring schematic diagram and block symbol of the Drum Writer indicated by block symbol 246 in FIG. 9, by block symbols 309 through 312 in FIG. 12 and by block symbol 335 in FIG. 13.

Figures 20, 21:
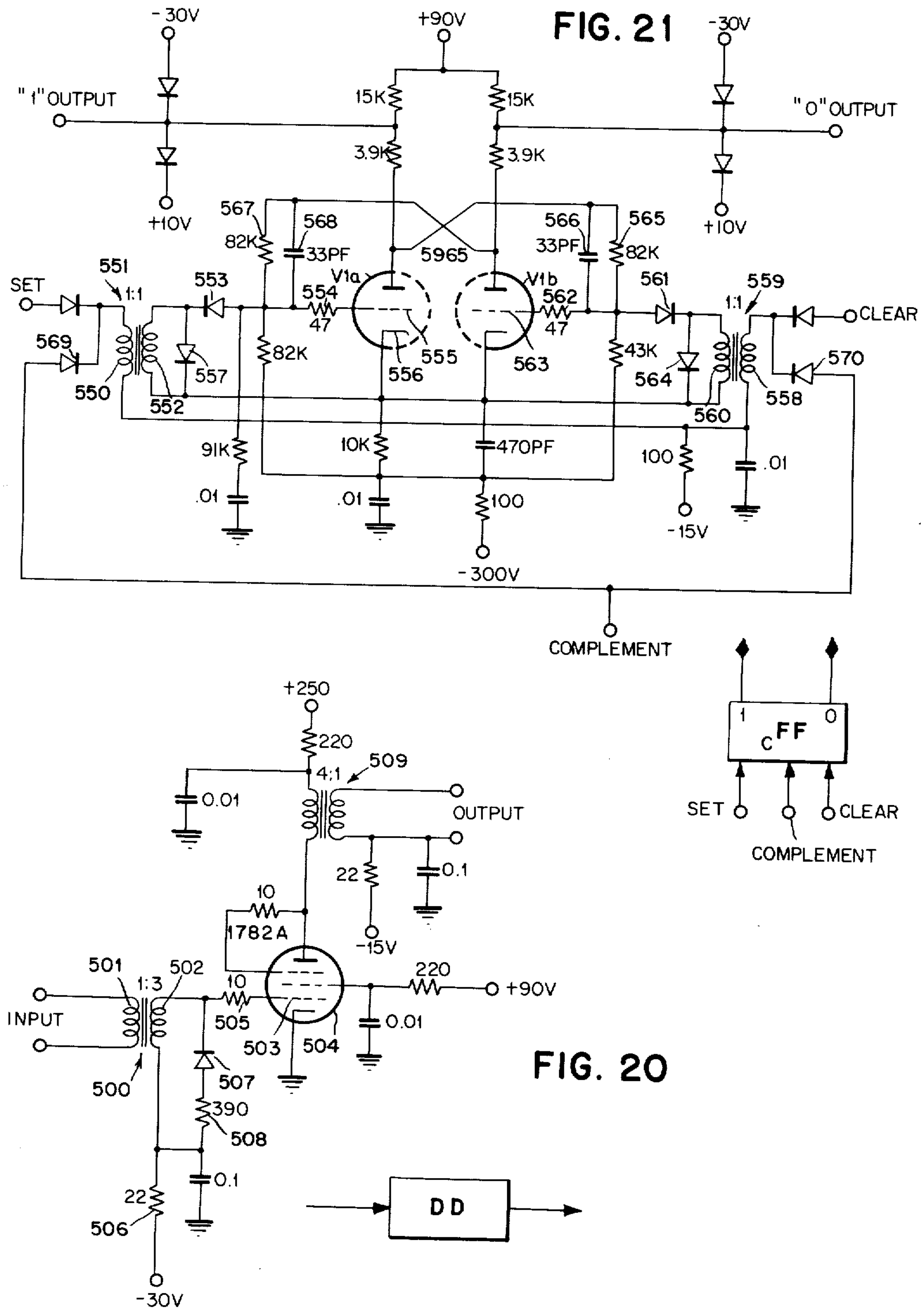

FIGURE 20 is a wiring schematic diagram and block symbol of the Delay Driver Circuit indicated by block symbols 206, 216 and 224 in FIG. 8.

FIGURE 21 is a wiring schematic diagram and block symbol of the Model C Flip-flop indicated by block symbol 255 in FIG. 9, and block symbols 260, 263, 266, 280, 283 and 288 in FIG. 11.

Figure 22:
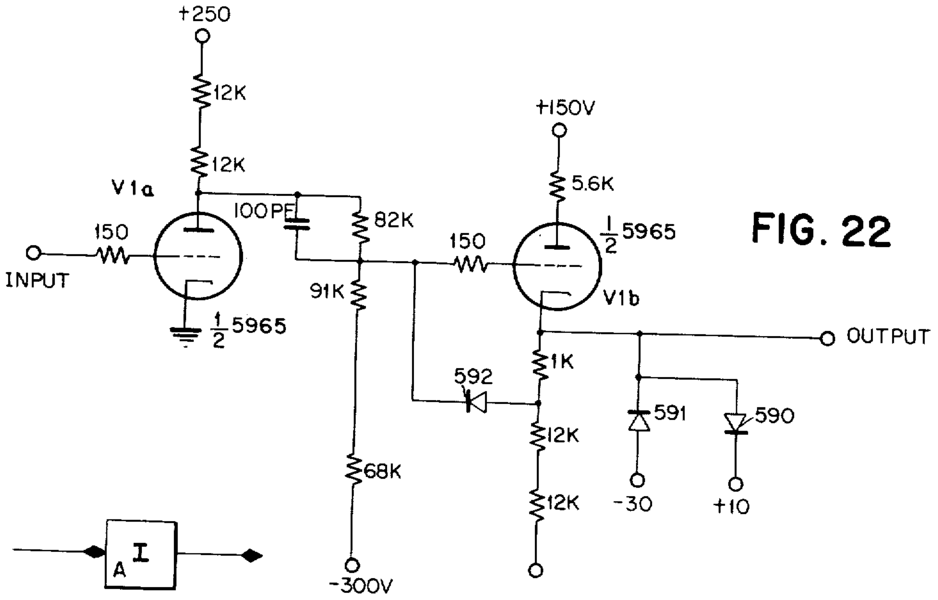

FIGURE 22 is a wiring schematic diagram and block symbol of the Model A Inverter indicated by block symbol 338 in FIG. 13.

Figure 23:
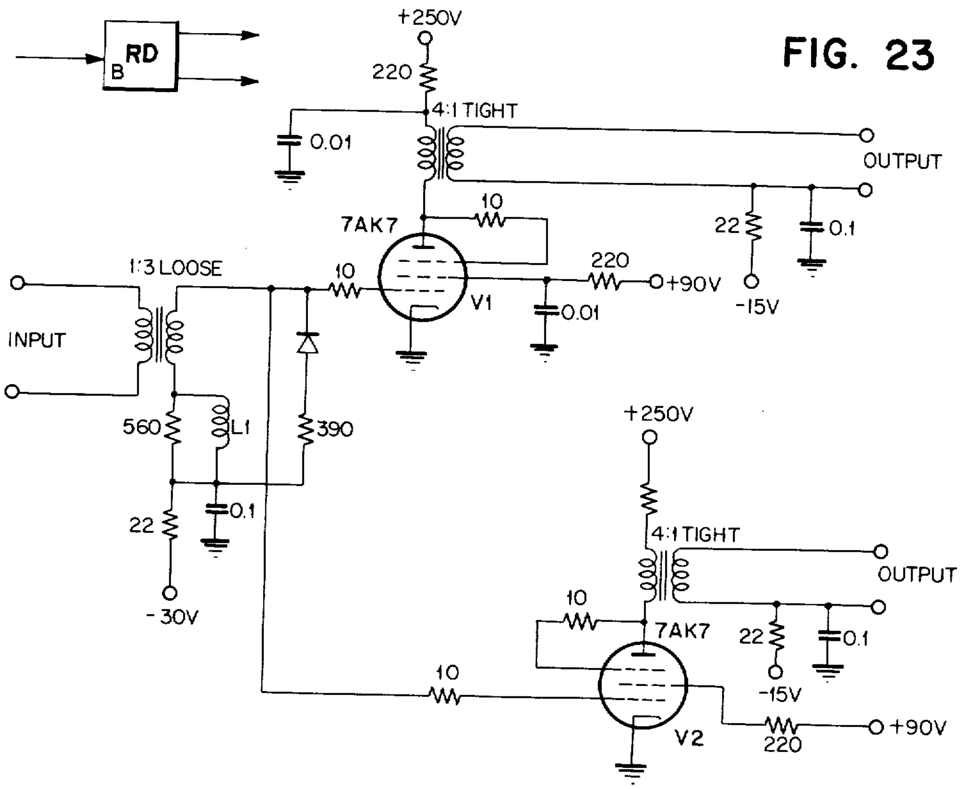

FIGURE 23 is a wiring schematic diagram and block symbol of the Model B Register Driver indicated by block symbol 304 in FIG. 12 and block symbols 364 and 369 in FIG. 15.

*Conventions employed*

Throughout the following description and in the accompanying drawings there are certain conventions employed which are familiar to certain of those skilled in the art. Additional information concerning those conventions is as follows:

In the block diagram figures of the drawing a conventional filled-in arrowhead is employed on lines throughout the drawing to indicate (1) a circuit connection, (2) energization with standard positive pulses and (3) the direction of pulse travel which is also the direction of control. A conventional un-filled-in arrowhead is employed on lines throughout the drawing to indicate the same things indicated by a conventional filled-in arrowhead except that the un-filled-in arrowhead illustrates a non-standard pulse generally having a duration considerably longer than the pulse represented by a filled-in arrowhead. A diamond-shaped arrowhead indicates (1) a circuit connection and (2) energization with a D.C. level Cables which are used to transfer data are shown as two parallel lines with the arrowheads at one end thereof and at some point intermediate the ends of those cables, the two parallel lines are widened either in the form of a circle or in the form of a rectangular box and numbers appear within the circle or the rectangular box. Cables employing the circle indicate that the lines or conductors of that cable convey information by the presence or absence of a pulse in parallel transfer whereas those cables having a rectangular box indicate that (1) if those lines are pulse lines, the lines of that cable convey information at different times or (2) that those lines are D.C. level conductors. The numbers appearing within the circle or the rectangular box of a cable indicate the number of conductors within the cable. The D.C. levels are on the order of 10 volts when positive and 30 volts when negative, whereas pulses indicated by conventional filled-in arrowheads are positive 1/10 microsecond, half-sine 20 to 40 volts. Pulses indicated by conventional un-filled-in arrowheads are usually considerably longer than 1/10 microsecond in duration and those referred to hereinafter are in general on the order of 1 to 2 microseconds in duration. The input and output lines of the block symbols are connected to the most convenient side of the block including the same side in some cases. An input line to a corner of a block symbol and an output line from the adjacent corner of that block symbol indicates that the pulses or D.C. levels are applied to the input of the circuit represented by the block and the input conductor is electrically connected to the output conductor of the adjacent corner.

Bold face character symbols appearing within a block symbol identify the common name for the circuit represented, that is, FF identifies a flip-flop, GT a gate circuit, OR a logical OR circuit, and so forth. The character subscripts preceding bold face characters identify the model of the circuit identified by the bold face character, that is, $_{A}$FF identifies the model A flip-flop, $_{C}$FF identifies the model C flip-flop and so forth.

In the description the general arrangement of the apparatus of a preferred embodiment of this invention will first be described with respect both to the manner in which the various circuit components and apparatus are interconnected and in respect to the general over-all operation which is performed by these components and apparatus. The description of the general arrangement will be followed by separate and detailed descriptions of the various components and apparatus, which so require it, and each section of the description will have a heading which indicates the apparatus about to be described. The following is an Index or Table of Contents of the description:

TABLE OF CONTENTS

| | Column Number |
|---|---|
| General Arrangement | 4 |
| Drum and Head Assembly | 10 |
| Timing Circuit | 12 |
| Write Status Circuit | 13 |
| Control Circuit | 15 |
| Write Circuit | 17 |
| Read Status Circuit | 18 |
| Read Circuits and Sample Gates | 19 |
| Temporary Storage Register | 20 |
| Basic Circuits: | |
| Time Pulse Generator | 20 |
| Drum Write Driver | 23 |
| Read Circuit | 24 |
| Drum Writer | 24 |
| Delay Driver | 25 |
| Model D Cathode Follower | 25 |
| Model C Flip-Flop | 25 |
| D.C. Inverter | 27 |
| Model B Register Driver | 27 |
| Other Basic Circuits | 27 |

*General arrangement*

Referring now to FIGURE 1, Data Sources indicated by block symbols 1 and 3 may be any suitable devices capable of producing in rapid succession parallel words of data on the conductors of cables 5 and 7 respectively. For the purposes of this description a parallel word of data means a plurality of simultaneous binary signals which represent data, for example, at any given instant the various conductors of cable will each be energized with a D.C. level of positive 10 volts if that conductor is to represent a binary One and a D.C. level of negative 30 volts if that conductor is to represent a binary Zero. Each of the Data Sources 1 and 3 is also provided with suitable means to produce, on synchronizing conductors 9 and 11 respectively, signals indicating that the D.C. levels on the conductors of cables 5 and 7 are representative of words of data.

The Data Sources 1 and 3 are interconnected with a Control Circuit 13, to be described in more detail hereinafter. For the purposes of the immediate description, Control Circuit 13 is any circuit capable of performing the following functions: (1) in response to a synchronizing signal on conductor 9, followed by a drum synchronizing signal on the conductor labeled OD–1, followed by a Demand signal on the conductor labeled Demand, produces pulses on particular ones of 24 of the conductors of cable 15 which correspond to conductors of cable 5 which have positive D.C. levels thereon and produces pulses on the remaining 8 conductors of cable 15 indicating that the pulses on the 24 conductors of cable 15 are being transferred from Data Source 1; (2) provided that no data is immediately available for transfer from Data Source 1, in response to a synchronizing signal on conductor 11, followed by a drum synchronizing signal on the conductor labeled OD–1, followed by a Demand signal on the conductor labeled Demand, produces pulses on particular ones of 24 of the conductors of cable 15 which correspond to conductors of cable 7 which have positive D.C. levels thereon and produces pulses on the remaining 8 conductors of cable 15 indicating that the pulses on the 24 conductors of cable 15 are being transferred from Data Source 3; (3) produces a pulse on conductor labeled Data Available provided that when a Demand pulse is received, data is available to be transferred from Data Source 1 or Data Source 3.

Each of the 32 conductors of cable 15 is connected to the corresponding Write Circuit of Write Circuits 17, to be described in greater detail hereinafter. For the purposes of the immediate description, each Write Circuit of Write Circuits 17 has one input conductor which is its associated conductor of cable 15 and two output conductors. In response to a pulse on the conductor labeled Clear Write Circuits, followed by a pulse on conductor labeled Write, followed by a pulse on conductor labeled OD–3+1.7 microseconds, each Write Circuit produces a current pulse of one polarity (Write a One signal) on its pair of conductors of cable 19 if it has received a pulse on its input conductor, and a current pulse of opposite polarity (Write a Zero signal) if it has not received a pulse on its input conductor.

Each pair of conductors of cable 19 is connected to an associated write head of Write Heads 21. The Write Heads 21 are suitably positioned with respect to the magnetic surface of a Drum 23, which is immediately adjacent to each head. The current pulses from each write circuit cause a spot or a portion of the magnetic surface to be magnetized in one direction when the write head is energized by a Write a One Signal and to be magnetized in the other direction when energized by a Write a Zero signal. The group of 32 axially positioned spots that are simultaneously recorded upon by the currents from the write circuits is called a register.

Briefly summarizing what has been stated with respect to the general arrangement, a pulse on the conductor labeled Demand will cause the positive D.C. level data signals on the conductors of cable 5 or on the conductors of cable 7 to be transformed in Control Circuit 13 into data pulses which are accompanied by identification pulses. Those data pulses and identification pulses are supplied to Write Circuits 17 where, in response to a pulse on the conductor labeled Write, those pulses are transformed into Write a One signals. Write a Zero signals are generated in those write circuits which do not receive a data pulse or an identification pulse. The Write Heads 21 cause the bits of a register on the magnetic surface of Drum 23 to be magnetized in one direction in response to those Write a One signals and to be magnetized in the opposite direction in response to those Write a Zero signals.

As will be more fully described hereinafter, the Drum 23 rotates so that the register on the drum surface upon which the word was written will pass under Read Heads 25. Each read head of Read Heads 25 is positioned with respect to the magnetic surface of Drum 23 to have voltages induced therein corresponding to the magnetic state of the drum surface, caused by its corresponding write head, when the surface passes beneath it. Each read head of Read Heads 25 is connected by way of a pair of output conductors of cable 27 to a corresponding read circuit of Read Circuits and Sample Gates 29.

Read Circuits and Sample Gates 29 will be described in more detail hereinafter. For the purpose of the immediate description, each read circuit and associated sample gate has as a data signal input, its associated pair of conductors of cable 27 and has a single output conductor. Each read circuit and associated sample gate produces a pulse on its associated output conductor of cable 31 in response to a pulse on the conductor labeled Read Sample if the Read Sample pulse occurs during the time that its data signal input is representative of a binary One. Thus the read circuits and their associated sample gates can deliver in the form of standard pulses the word that was written on the drum to the conductors of cable 31.

Each conductor of cable 31 is connected to an associated stage of Temporary Storage Register 33 to be described in greater detail hereinafter. For the purpose of the immediate discussion, the Temporary Storage Register 33, in response to a pulse on conductor labeled Clear TSR (Clear Temporary Storage Register), followed by the word in the form of pulses on cable 31, stores that word. The Temporary Storage Register by means of pulses on cable 35 in response to a pulse on the conductor labeled TEMP ST REG DPM (Temporary Storage Register to Data Processing Machine) translates the stored words to the Data Processing Machine.

The conductors of cable 35 are applied to a device labeled Data Processing Machine which is any suitable device for receiving and processing the signals received from the conductors of cable 35. Such machines are well known in the art and require no further explanation. The data processing machine delivers a positive D.C. level to the conductor labeled Read whenever it is desired that the data processing machine have input signals applied thereto from Data Sources 1 or 3.

Briefly summarizing what has been stated above with respect to the general arrangement, after a word of data from Data Sources 1 or 3 has been written in the form of magnetized spots on the Drum 23, those magnetized spots will induce voltages in the Read Heads 25 each time those spots pas beneath them. Those induced voltages are applied to Read Circuits and Sample Gates 29 which produce pulses on the conductors of cable 31 if representative of a One and also if a pulse is received from the conductor labeled Read Sample during the time that the induced voltages are received. The words received from the Read Circuits and Sample Gates 29 are stored in Temporary Storage Register 33 where they are delivered to the Data Processing machine in response to a pulse on the conductor labeled Temporary Storage Register to Data Processing Machine.

From the preceding description, it will be noted that before a word of data from Data Sources 1 or 3 can be written on the drum, certain control pulses must be generated in a particular sequence. This sequence of the control pulses is as follows:

| | |
|---|---|
| Clear Write Circuits | Data Available |
| OD–1 | Write (OD–3) |
| Demand | OD–3+1.7 μsec. |

It should be further be noted that the Demand pulse should not be generated unless the drum register to be written into is empty and the Write pulse and the OD–3+1.7 μsec. pulse should not be generated unless the Control Circuit 13 has generated a Data Available pulse.

A Write Status Circuit 37 and a Timing Circuit 39 generate those control pulses at the proper times.

A Read Head 41 is positioned with respect to the surface of Drum 23 so that as the drum rotates, a portion of the drum surface (known in the art as a timing channel) passes underneath it. This timing channel is indicated in the drawing as a dotted line, labeled accordingly, and is in reality merely a succession of magnetized spots. These spots are recorded on the drum surface in such a manner that when the drum rotates a sine wave signal is induced in the Read Head 41. Each magnetized spot of the timing channel occupies a space indicating a drum register. As a magnetized spot passes underneath the Read Head 41, one sine wave cycle of voltage is induced in the winding of the read head. Assuming that there are 2048 equidistantly spaced saturated spots in the timing channel, the Drum is said to have a closed timing channel and 2048 registers.

A Read Head 43 is positioned with respect to the surface of Drum 23 so that as the Drum rotates, a portion of the drum surface (known in the art as an index channel) passes underneath it. This index channel is indicated in the drawing as a dotted line, labeled accordingly, and is in reality merely a succession of equidistantly spaced magnetized spots with one of those spots being magnetized in the opposite direction from all other spots. When this one magnetized spot passes underneath Read Head 43, one sine wave of voltage of opposite phase with respect to the other cycles is induced in the winding of the read head. The output conductors of read heads 41 and 43 are applied as inputs to a Timing Circuit 39 to be described in greater detail hereinafter.

For the purposes of the immediate description, this Timing Circuit is capable of performing the following functions: (1) upon receipt of each cycle of voltage from Read Head 41 it sequentially pulses the conductors labeled OD–1 through OD–4, (2) in response to the cycle of voltage received from Read Head 43, which is of opposite phase to all other cycles, it produces a pulse on the conductor labeled ODIX, (3) in response to each cycle of voltage received from Read Head 41 it produces one pulse on the output conductor labeled Status Write Sample.

A Read Head 45 and a Write Head 47 are positioned with respect to the surface of Drum 23 so that a channel labeled OD Status Channel passes underneath those heads as the drum rotates and a Write Head 49 and a Read Head 51 are positioned with respect to the surface of Drum 23 so that a channel labeled CD Status Channel passes underneath those heads as the drum rotates. The read head 45 has its output conductors and the write head 49 has its input conductors connected to Write Status Circuit 37 and as shown in the drawing the Timing Circuit 39 also delivers pulses to the Write Status Circuit 37 by way of its conductors labeled OD–1 through OD–4, ODIX (OD Index) and Status Write Sample.

The Write Status Circuit 37 will be described in greater detail hereinafter; however, for the purpose of this description, that circuit performs the following functions: (1) if a Zero signal or no signal is received from read head 45 (indicating that the next register which is to be written in by Write Heads 21 either contains no word or a word which has already been transferred to the data processing machine), a Demand pulse coincident in time with the pulse on input conductor OD–3 is applied to the output conductor labeled Demand, (2) if a One signal is received from read head 45 (indicating that the next register which is to be written in by Write Heads 21 contains a word which has not yet been transferred to the data processing machine), a Write a One signal coincident in time with the pulse received from the conductor labeled OD–3 is applied to write head 49, (3) if a pulse is received from the conductor labeled Data Available, a Write pulse coincident in time with the pulse received on the conductor labeled OD–3 is applied to the conductor labeled Write and a Write a One signal coincident in time with the pulse received on the conductor labeled OD–3 is applied to write head 49, (4) if a Zero signal or no signal is received from the read head 45 and no Data Available pulse is received in response to the pulse on the conductor labeled Demand, a Write a Zero signal coincident in time with the pulse on conductor OD–3 is applied to write head 49, and (5) if no Zero signals are received from read head 45 between two successive pulses on the conductor labeled ODIX (OD Index), a pulse is delivered to the output conductor labeled Drum Full Alarm Signal.

The write head 47 and read head 51 are connected to a Read Status Circuit 53 which also receives input pulses from the Timing Circuit 39 by way of conductors labeled CD–1, CD–4 and Status Write Sample. The Read Status Circuit 53 will be described in greater detail hereinafter. However, for the purpose of this description those circuits perform the following functions: (1) provided that (*a*) a Read signal (positive 10 volts) is received from the conductor labeled Read and (*b*) a One signal is received from read head 51, then a Read Sample pulse coincident in time with the pulse on the conductor labeled CD–1 is applied to the conductor labeled Read Sample and a Write a Zero signal coincident in time with the pulse received from the conductor labeled Status Write Sample is applied to write head 47, (2) provided that (*a*) a Read signal (positive 10 volts) is received from the conductor labeled Read and (*b*) a Zero signal is received from read head 51, then a Write a Zero signal coincident in time with the pulse received on the conductor labeled Status Write Sample is applied to write head 47, (3) provided that (*a*) no Read signal (negative 30 volts) is received from the conductor labeled Read and (*b*) a Zero signal is received from read head 51, then a Write a Zero signal coincident in time with the pulse received from the conductor labeled Status Write Sample will be applied to the write head 47, and (4) provided that (*a*) no Read signal (negative 30 volts) is received from the conductor labeled Read and (*b*) a One signal is received from read head 51, then a Write a ONE signal coincident in time with the pulse received on the conductor labeled Status Write Sample will be applied to the write head 47.

Since an appreciable length of time is needed between the time that read head 45 reads the status of a particular register and the time at which action is taken in response to those signals, that is, a word of data is written on the drum, the status signal of any particular drum register must be produced by read head 45 a sufficient length of time ahead of the time at which the register corresponding to that status signal comes under the Write Heads 21. In the illustrated preferred embodiment, the read head 45 is advanced with respect to the Write Heads 21 and write head 49 by a distance equal to one and one-half registers and the Write Head 47 is delayed with respect to the Read Heads 25 and read head 51 by a distance equal to one-half register.

Drum 23 may be erased by any suitable means, as for example, by means of a drum erase system of the type illustrated and described in co-pending application Serial No. 477,553 (IBM Docket 4820) titled "Electromagnetic Eraser" filed by C. D. Jackson et al. on December 24, 1954. The Timing Channel and Index Channel may be written on Drum 23 by any suitable means, examples of which are well known in the art.

Assuming that the Drum 23 has been erased and signals appear in only the timing channel and the index channel, if no Read signal is received by the Read Status Circuit and No Data Available pulses are received by the Write Stataus Circuit, the Write Heads 47 and 49 will continue to write Zeros coincident in time with the Status Write Sample pulses and therefore after one complete revolution of the drum, the CD Status channel and the OD Status channel will both be a succession of Zeros and a pulse will be delivered to the conductor labeled Demand by the Write Status Circuit 37 which is coincident in time with the pulses received from the conductor labeled OD–3.

As soon as either Data Source 1 or Data Source 3 has produced a word of data, a Data Available pulse will be generated by the Control Circuit 13 in response to the pulse on the conductor labeled Demand and this word of data will be delivered to the Write Circuits 17. The Write Status Circuit 37 in response to this Data Available pulse will deliver a pulse to the conductor labeled Write which is coincident in time with the pulse received from the conductor labeled OD–3 and the Write Status Circuit 37 in response to that Data Available pulse will also deliver a Write a One signal to the Write Head 49 coincident in time with the Status Write Sample pulse. The pulse on the conductor labeled Write, followed by a pulse on the conductor OD–3+1.7 microseconds will cause the word received by the Write Circuit 17 to be delivered to the Write Heads 21 in the form of current pulses having a duration of 1.6 microseconds. Therefore, when the word of data is written on the drum, a One is written in the CD Status Control Channel indicating that that register of the drum is full.

When a full drum register passes beneath Read Heads 25, the status signal of that register (a ONE in the CD Status Channel, is sensed by read head 51 and if a positice D.C level is received on the conductor labeled Read, the Read Status circuit will produce a pulse on the conductor labeled Read Sample coincident in time with a pulse received on conductor labeled CD–1. When this Read Sample pulse is received by Read Circuits and Sample Gates 29, the signals from that full drum register will be delivered to the Temporary Storage Register 33. At some time later (a time period equal to ½ register) following a Read Sample pulse, the Read Status Circuit 53 delivers a Write a ZERO signal to Write Head 47 to indicate that that previously will register is now empty.

Figure 2:
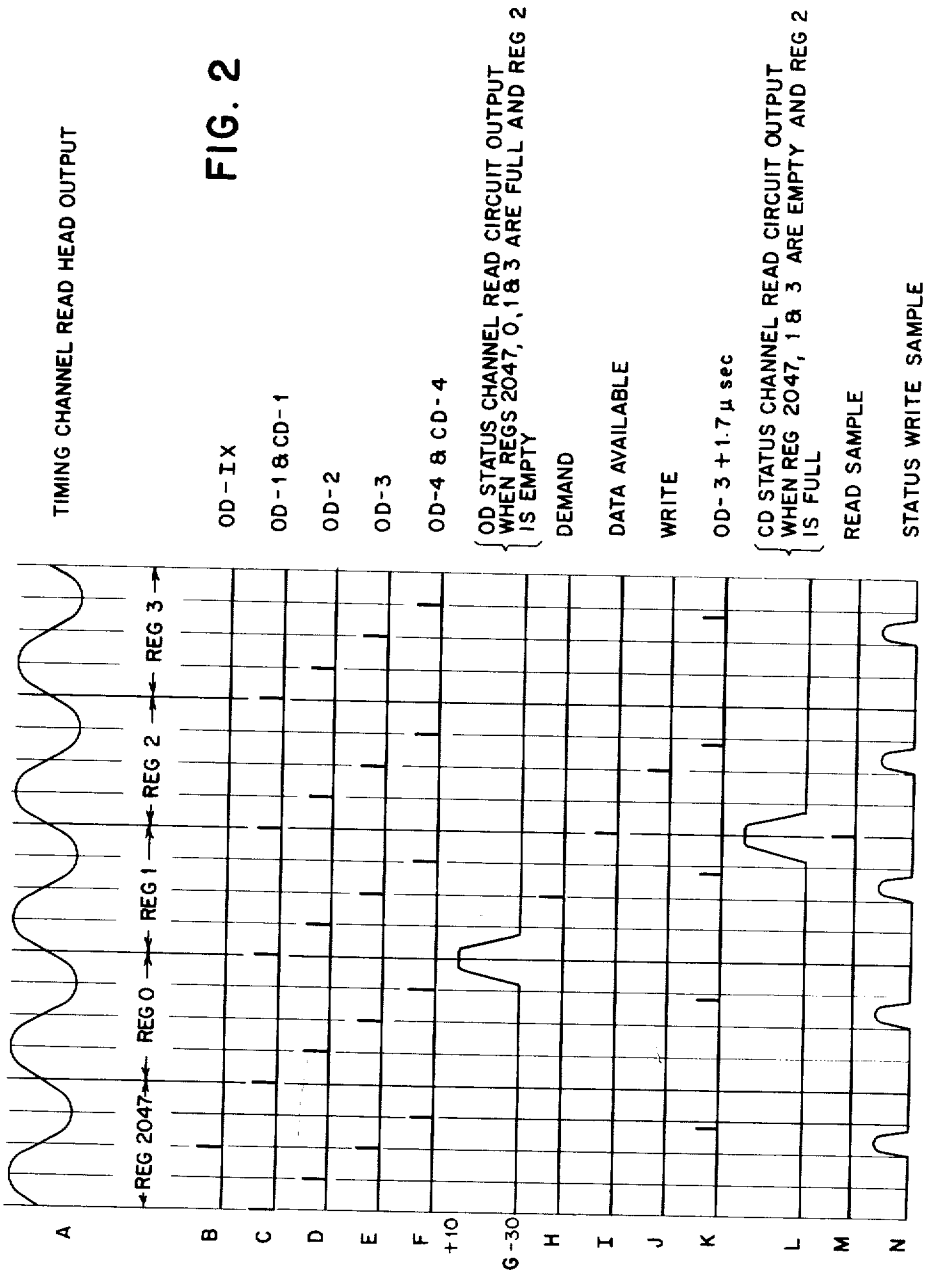
FIGURE 2 is a family of curves illustrating the timing relationships of various signals in the apparatus herein described.

From the above description it should be noted that each drum register is divided into four time periods. Referring now to FIG. 2, the timing relationship between the various signals is shown as a family of curves.

In FIG. 2, curve A illustrates the sinusoidal waveform output of the Timing Channel read head and each cycle of that sine wave could be said to define a drum register. The Index Channel read head output is substantially the same as the Timing Channel read head output and differs on in that the output has one cycle (corresponding in time to Drum Register number 2047) which is 180° out of phase to all the other cycles. As will be described in greater detail hereinafter, that cycle causes an OD Index pulse (curve B of FIG. 2) to be generated at the center of the register number 2047. The various OD and CD timing pulses are shown as curves C through F and are labeled accordingly.

All drum reading operations occur at 1 time, that is in response to either the OD–1 pulses or CD–1 pulses and all writing operations occur at 3 time, that is in response to Status Write Sample pulses or Write pulses followed by OD–3+1.7 μsec. pulses.

Curves G through K of FIG. 2 illustrate the timing relationship of various signals under the assumed conditions that Drum Registers numbered 2047, 0, 1 and 3 are full, Drum Register numbered 2 is empty and that data is available to be written on the drum. The OD Status Channel signals for Registers 2047, 1 and 3 will be ONE's and the status signal for Register 2 will be ZERO under the assumed conditions. As noted previously, these OD Status Channel Signals will be sensed by read head 45 at a time equal to one and one-half registers before the drum registers come beneath the Write Heads 21. As will be described in detail hereinafter, the signals produced by the read head 45 are applied to a Read Circuit which is part of Write Status Circuit 37. In the interest of clarity, the signals produced by the read head 45 are shown after they have been properly shaped by the referred to Read Circuit and those properly shaped signals are shown in FIG. 2 as curve G. It should be noted from curve G that a positive going signal occurs between Register 0 and Register 1. This positive going signal results in a demand pulse being generated at 3 time of Register 1 as shown in curve H. In response to this Demand pulse, Control Circuit 13 will deliver a Data Available pulse at 1 time of Register 2 as shown in curve I since it is assumed that data is available to be written on the drum. In response to this Data Available pulse, the Write Status Control Circuit 37 generates a Write pulse at 3 time as shown by curve J. This Write pulse in combination with the next following OD–3+1.7 μsec. pulse (curve K) causes the word of data to be written into Drum Register number 2.

Curves L, M and N of FIG. 2 illustrate the timing relationship of various signals under the assumed conditions that the Drum Registers 2047, 0, 1 and 3 are empty, Drum Register 2 is full and a Read signal (positive 10 volts on conductor labeled Read) is produced by the Data Processing Machine. The CD Status Channel signals for Registers 2047, 1 and 3 will be ZERO's and the status signal for Register 2 will be ONE under the assumed conditions. As noted previously, these CD Status Channel signals will be sensed by read head 51. As will be described in detail hereinafter, the signals produced by the read head 51 are applied to a Read Circuit which is a part of Read Status Circuit 53. In the interest of clarity, the signals produced by the Read Head 51 are shown after they have been properly shaped by the referred to Read Circuit and these properly shaped signals are shown in FIG. 2 as curve L. It should be noted from the curve L that a positive going signal occurs between Register 1 and Register 2 which results in a Read Sample pulse being generated at 1 time (curve M) since it has been assumed that a positive D.C. level exists on the conductor labeled Read.

Curve N of FIG. 2 shows the timing of the Status Write Sample pulses which are generated by the Timing Circuit 39. These Status Write Sample pulses are received by the Write Status Circuit 37 and the Read Status Circuit 53 to energize their respective write heads 49 and 47 at 3 time.

The control of the data writing and data reading operations of the Drum 23, as above described, could be said to be a dynamic system, that is, the Status Channels are being recorded and read continuously. A brief summary of the operation of that dynamic system can be expressed as a series of rules to be obeyed by the system. Those rules are as follows:

(A) With respect to the writing operation control (read head 45 in OD Status Channel and write head 49 in CD Status Channel)—

(1) If a ZERO or no signal is read in the OD Status Channel and a word of data is available, write the word of data and write a ONE in the CD Status Channel.

(2) If a ZERO or no signal is read in the OD Status Channel and no word of data is available, write a ZERO in the CD Status Channel.

(3) If a ONE is read in the OD Status Channel, write a ONE in the CD Status Channel. No word of data can be recorded.

(B) With respect to the reading operation control (read head 51 in CD Status Channel and write head 47 in OD Status Channel)—

(1) If the drum is instructed to read (by a positive D.C. level on the conductor labeled Read) and a ONE is read in the CD Status Channel, read the word of data into the Temporary Storage Register 33 and write a ZERO in the OD Status Channel.

(2) If the drum is instructed to read and a ZERO is read in the CD Status Channel, write a ZERO in the OD Status Channel and do not read the word of data from the drum.

(3) If the drum is not instructed to read (by a negative D.C. level on the conductor labeled Read) write a ONE in the OD Status Channel if a ONE is read in the CD Status Channel and write a ZERO in the OD Status Channel if a ZERO or no signal is read in the CD Status Channel.

*Drum and Head Assembly*

The Drum and Head Assembly will be described with reference to FIGS. 3 through 7.

The Drum, shown in FIG. 1 in schematic form and assigned reference number 23, is constructed of a thin copper tubing pressed onto a steel cylinder. Flat discs 63, 65 (FIG. 4) are pressed into the ends of the cylinder and tube 67 having shoulders 69 and 71. The pulley 73 is secured to disc 63 by means of screws 75. Outer races 77, 79 of tapered roller bearings 81, 83 are secured to the inside of tube 68 and inner races 85, 87 are secured to the end portions of a stationary shaft 89. The inner races 85, 87 are adjustably positioned on the shaft 89 by means of nuts 91, 92. Thrust bearings 93 and 95 are provided between the stationary shaft 89 and tube 68.

As noted previously, the drum is constructed of a thin copper tubing pressed onto a steel cylinder. When the drum has been assembled on the shaft 89, the shaft is secured to a suitable support and the drum is rotated. While being rotated, the surface is cut to an eccentricity of approximately .00025 inch. After cutting, the drum is plated with a mganetic material such as nickel-cobalt.

After the drum has been plated, the shaft 89 is secured at each end to a support frame 97 by means of clamps 99, 101.

Figure 3:
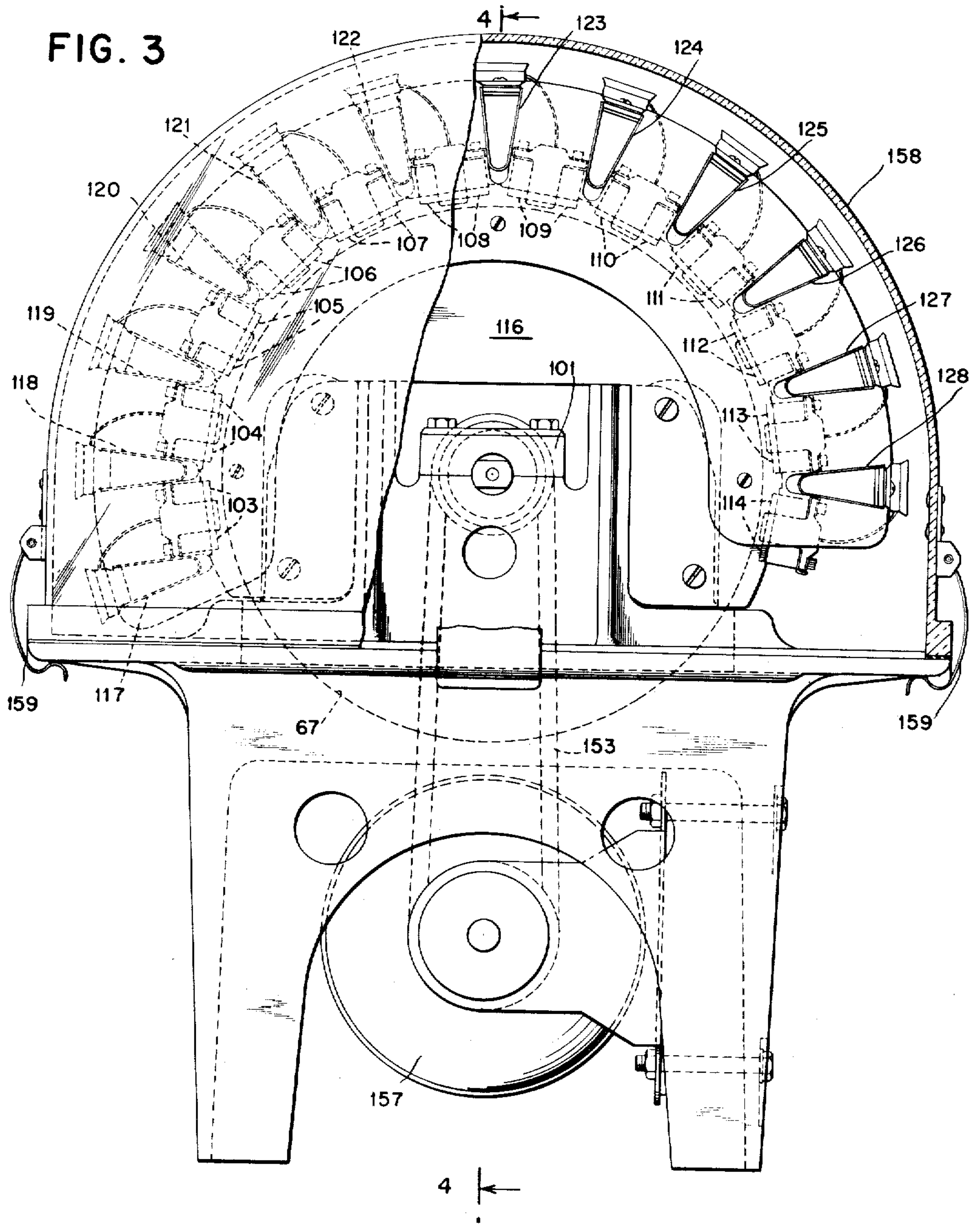
FIGURE 3 is an end view, partly in section, of the magnetic drum assembly which is shown in schematic form in FIG. 1.
Figure 6:
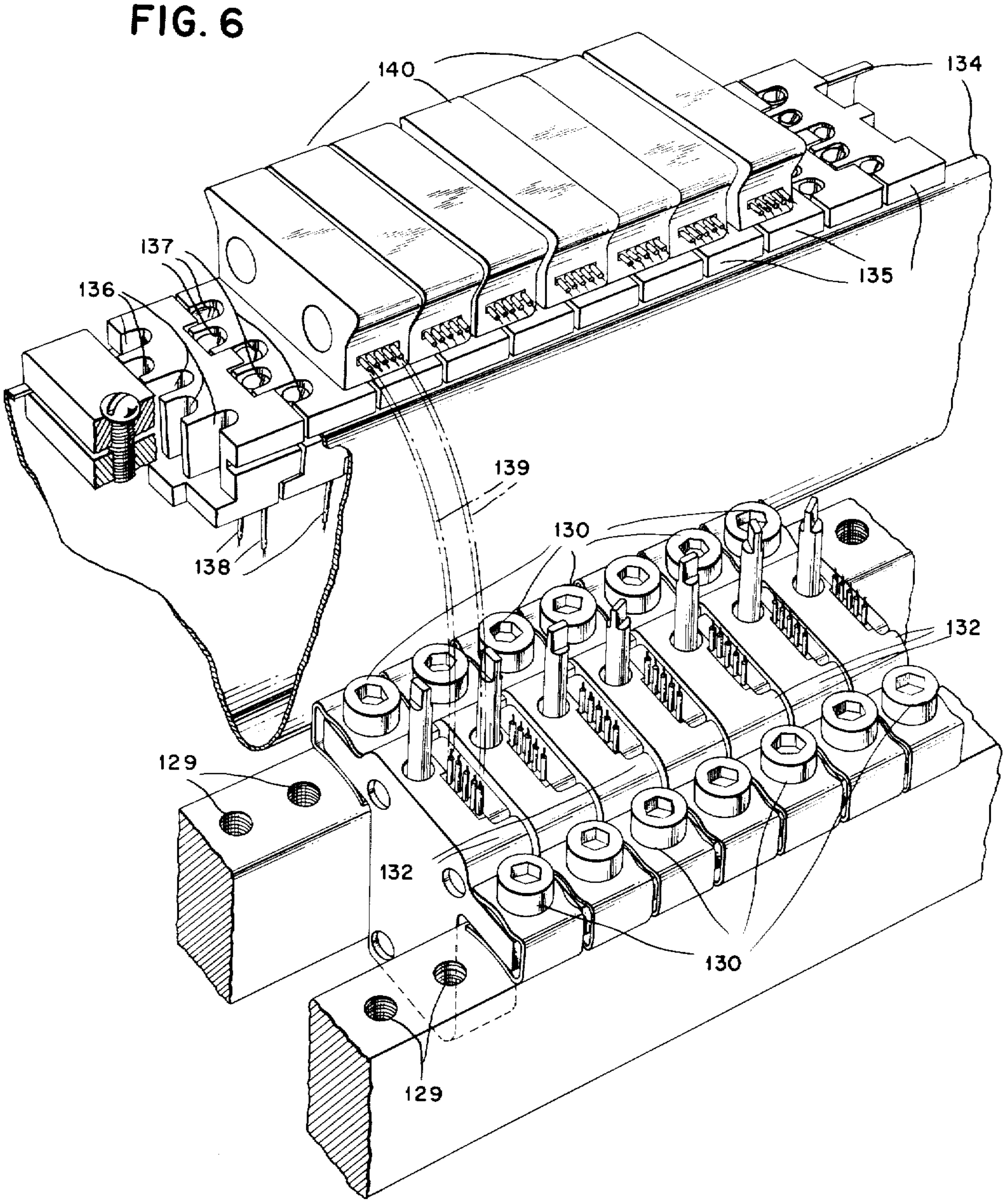
FIGURE 6 is a detailed isometric view of the read head and connector assemblies.

Pairs of head mounting bars 103 through 114 (FIG. 3) are secured at their ends to the head mounting supports 115, 116 (FIG. 4) which are attached to support frame 97. Mounted between the pairs of head mounting bars 103–114 are cable channels 117 through 128 (FIG. 3). FIG. 6 shows a detail view of portions of a pair of head mounting bars and their adjacent cable channel. Along the length of each head mounting bar are correspondingly spaced tapped holes 129 and secured between the mounting bars, by means of screws 130, are magnetic heads 132.

Each cable channel is of U shape and has turned-in lip portions 134. Frictionally engaging and held in alignment by the lip portions 134 are socket assemblies 135. Each socket assembly has cut-out portions 136 into which are secured socket contacts 137. Individual conductors 138 are connected to their corresponding socket contacts 137.

Each magnetic head has its conductors 139 connected to plug contacts of plug assemblies 140.

Figure 7:
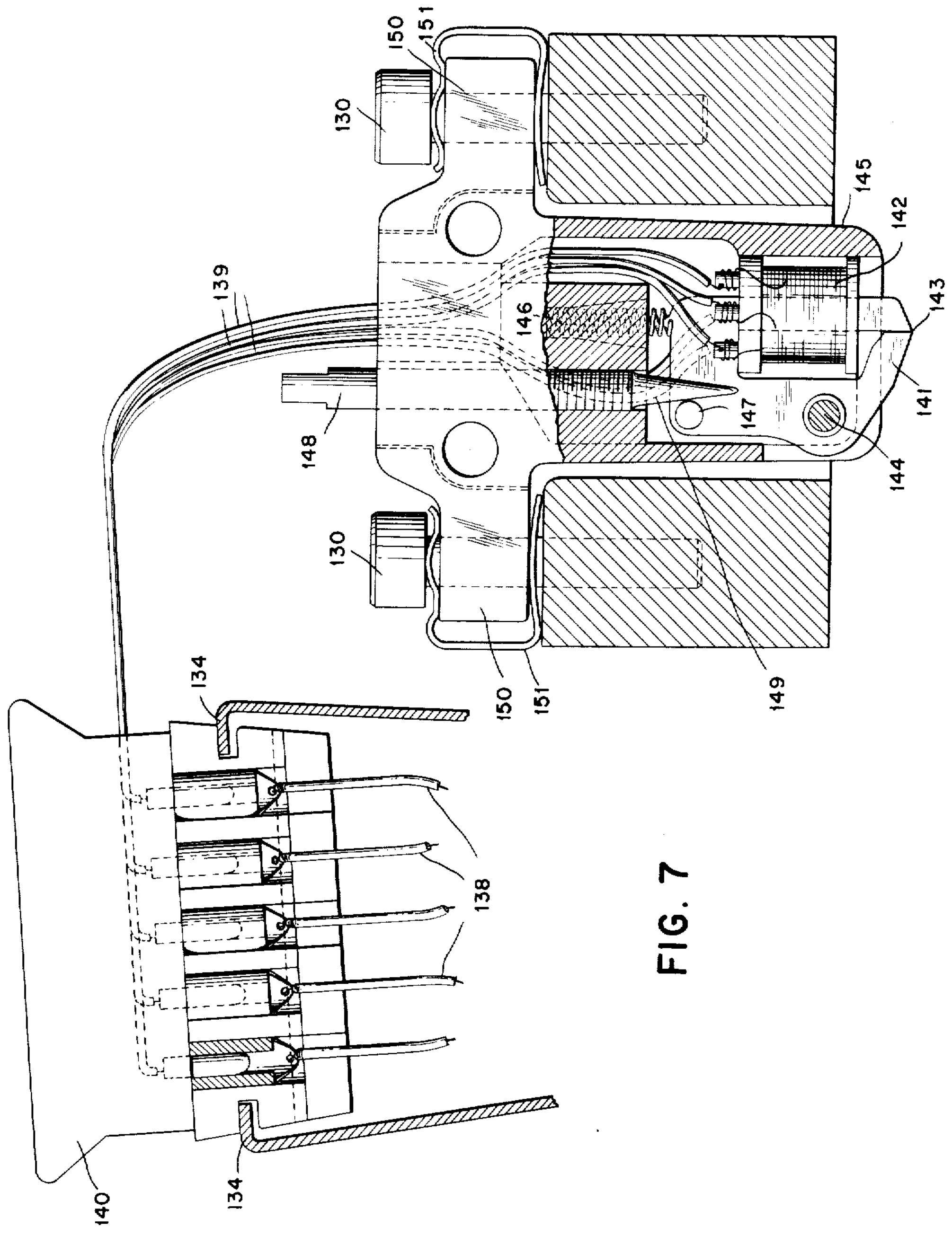
FIGURE 7 is a detailed view, partly in section, of a read head and an associated connector.

FIG. 7 shows a detail sectional view of a Magnetic Head having a laminated core 141 with a coil bobbin 142 positioned around one leg. The laminations are made from .002 inch thick Molybdenum Permalloy and have a copper shim filled gap 143. The core is rotatably mounted on pin 144 which is secured to the head body 145. The coil bobbin 142 is securely mounted on head body 145. Spring 146 biases the core in a clockwise direction as viewed in FIG. 7 and a pin 147 secured to the core 141 abuts screw stop member 148 at its tapered end 149. The head body 145 is provided with mounting arms 150 which are drilled to permit the mounting screws 130 to freely pass through and secure the head to the pair of head mounting bars. U-shaped spring members 151 are provided to permit the gap 143 of the head to be positioned circumferentially of the drum by loosening one of the screws 130 while tightening the other. The gap 143 of the head can be adjusted radially of the drum by turning screw stop member 148 which, by means of the tapered end 149, permits the core 141 to be rotated clockwise or counter-clockwise about pin 144.

Figure 4:
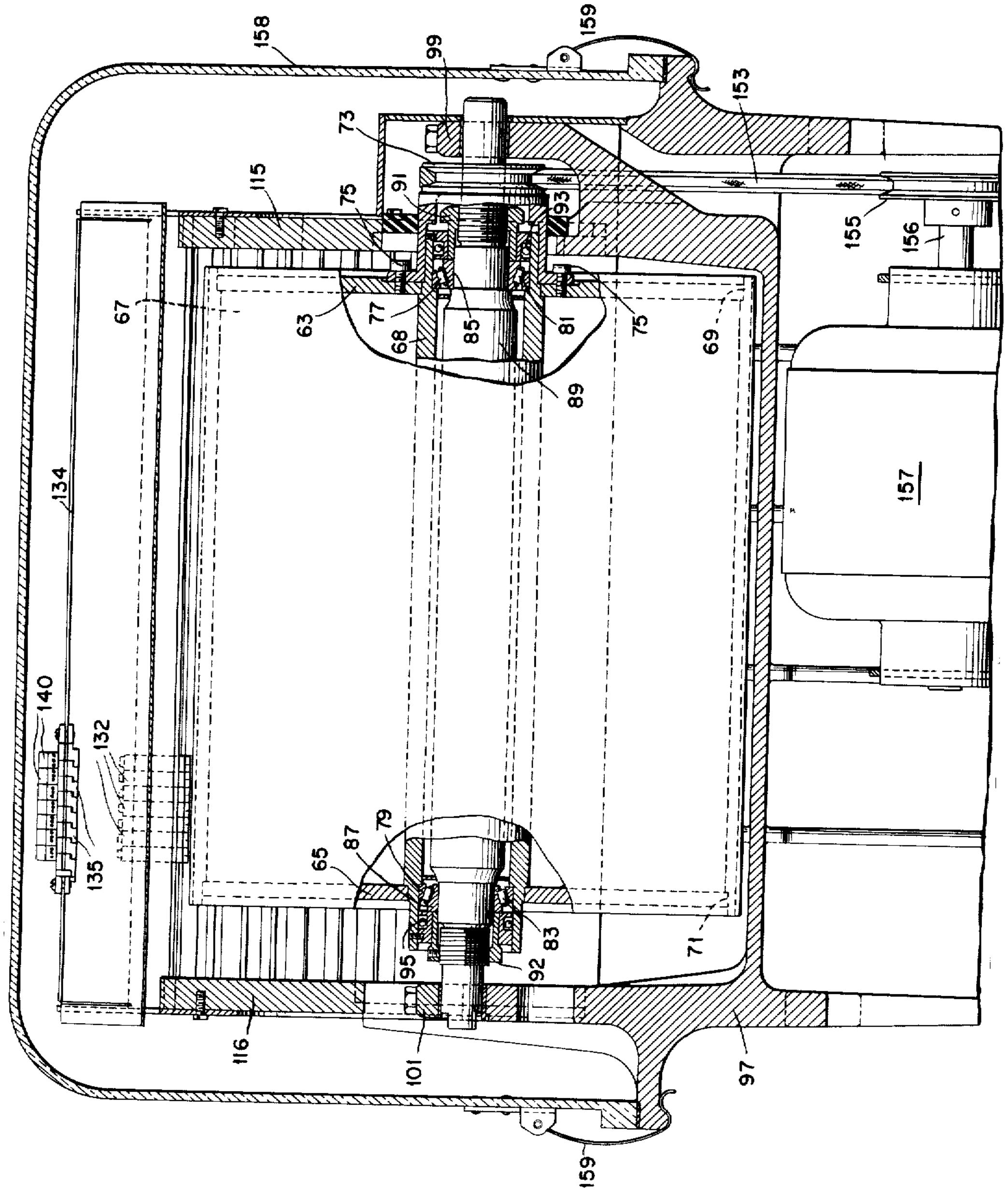
FIGURE 4 is a cross-sectional view taken along the line 4—4 of FIGURE 3.
Figure 5:
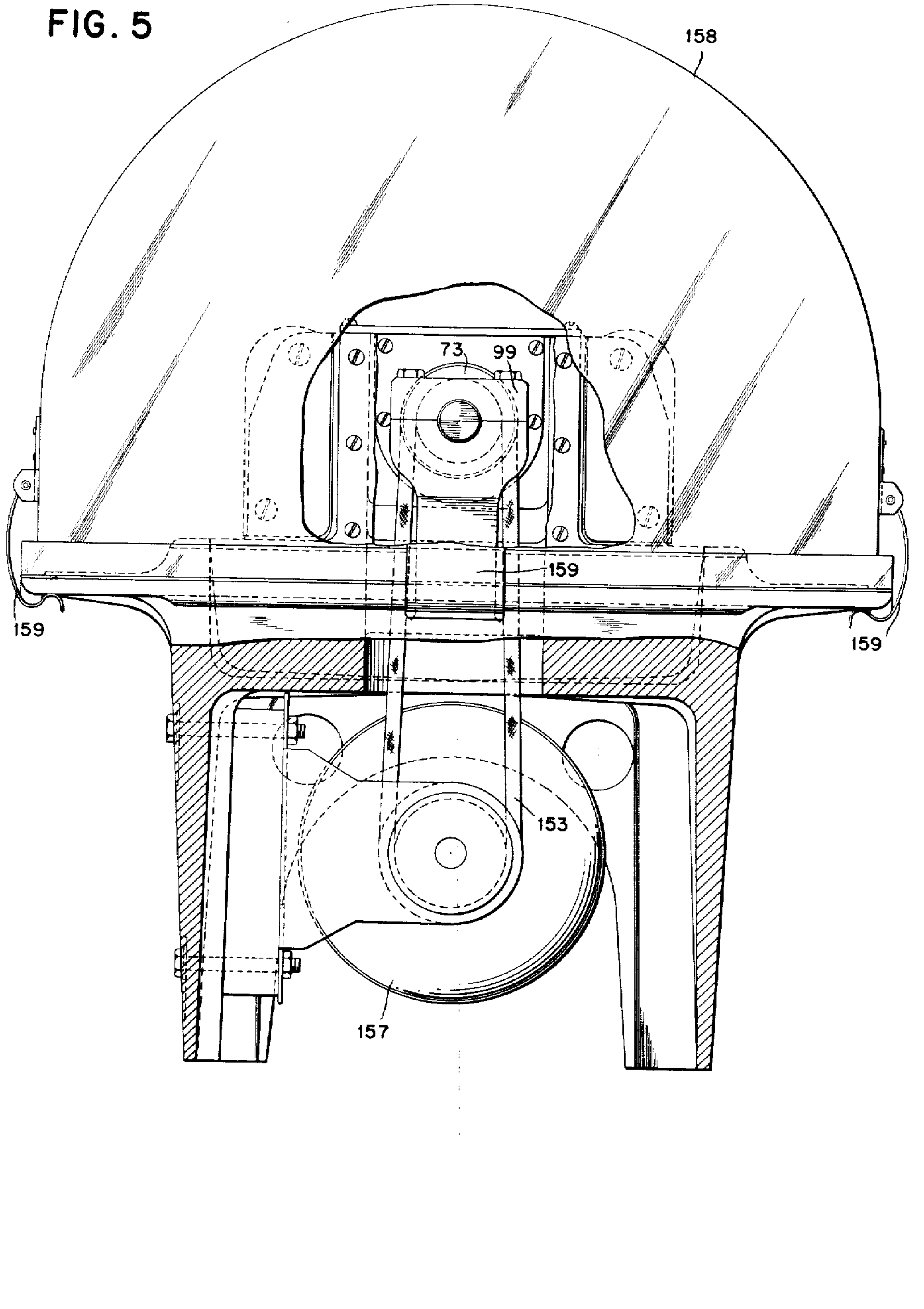
FIGURE 5 is an end view, partly in section, of the magnetic drum assembly which is shown in schematic form in FIG. 1.

Referring now to FIG. 4, pulley belt 153 interconnects pulley 73 with another pulley 155 which is secured to a shaft 156 of motor 157. The motor, which is secured to the support frame 97, is preferably a ½ horsepower, 2,914 r.p.m. synchronous motor.

A transparent, plastic cover 158, secured to the support frame 97 by means of spring clips 159, is provided to prevent dust from external sources from collecting in the area of the magnetic heads.

The heads mounted on a given mounting bar are positioned, with respect to the drum surface, to define spaced data recording channels. These data recording channels may be spaced .300 inch apart.

The heads mounted on any given mounting bar are offset with respect to the heads mounted on the adjacent bars so that there is .050 inch spacing between the data recording channels defined by one set of heads with respect to those channels defined by the next adjacent set of heads. It will be noted in FIG. 3 that 12 pairs of head mounting bars 103 through 114 are provided. The heads on mounting bar 103 cover the same channels as the heads on mounting bar 109, those on bar 104 cover the same channels as those on bar 110 and so on. In this way Write Heads 21 (FIG. 1) cover the same channels as Read Heads 25 (FIG. 1).

In a preferred embodiment illustrated in FIGS. 3–7, the drum diameter is 10.7 inches and has a length of 12.6 inches. If the length of the magnetic recording surface on Drum 23 is 12.6 inches, the dimensions of the heads are such that 40 heads may be mounted on each pair of bars, giving a total of 240 channels.

Although only 32 data recording channels, 2 Status Channels, 1 Timing Channel and 1 Index Channel are illustrated in FIG. 1, it will be understood that the Drum and Head Assembly provides sufficient channels that additional data channels as well as additional status channels may be employed to handle other data sources.

Some of the important features of the Drum and Head Assembly, shown in FIGS. 3–7 are:

(1) Screws 130 and 148 provide ease of adjustment of the heads with respect to the magnetic recording surface of the drum.

(2) The cable channels keep the many cables to the heads from interfering with adjustments of the heads.

(3) When the drum surface is cut for an eccentricity of approximately .00025 inch, it is rotated on the same stationary shaft which is employed during actual operation and this results in very little eccentricity during actual operation.

(4) The pulley 73 is positioned, with respect to the support frame 97, such that the forces exerted by pulley belt 153 will not cause bending of the shaft 89.

*Timing Circuit*

The Timing Circuit 39 shown as block 39 in FIG. 1 is shown in logical block schematic form in FIG. 8.

The Timing Channel read head 41 is shown in FIG. 1 as having its output conductors connected to Timing Circuit 39. As shown in FIG. 8, those conductors are connected as the input to a Time Pulse Generator 201.

The Time Pulse Generator 201, to be described in detail hereinafter, for the purpose of the immediate description is an electronic device having one input and two outputs. At the input to the Time Pulse Generator 201 is applied a continuous sinusoidal waveform which so conditions the generator as to allow the production of short duration pulses, or timing pulses at each of the input signal's zero crossings. One output (conductor 202) exhibits a pulse during each of the positive-slope zero crossings of the sinewave input, while the other output (conductor 203) exhibits a pulse during each of the negative-slope zero crossings of the sinewave input. In FIG. 2, the sine wave input is shown as curve A, the signals on conductor 202 as curve C, and the signals on conductor 203 as curve E.

The pulses on conductor 202 are amplified by pulse amplifier 204 whose output is applied to each of the conductors labeled OD–1 to Control Circuit, OD–1 to Write Status Circuit and CD–1.

The pulses on conductor 202 are further applied to a pulse amplifier 205 whose output is amplified by a delay driver 206. The output of delay driver 206 is delayed 1½ μsec. by delay circuit 207 whose output is amplified by pulse amplifier 208. The output of pulse amplifier 208 is delayed by ½ μsec. by delay circuit 209 whose output is amplified by pulse amplifier 210. The output of pulse amplifier 210 is delayed ½ μsec. by delay circuit 211 whose output is amplified by pulse amplifier 212. The output of pulse amplifier 212 is applied to conductor labeled OD–2.

In the illustrated preferred embodiment, the sine wave input to the Time Pulse Generator is a 100 kc. per second signal. Delay circuits 207, 209 and 211 cause the pulse on conductor 202 to be delayed a total of 2½ µsec. or ¼ cycle of the input signal.

The pulses on conductor 203 are amplified by pulse amplifier 213 whose output is applied to the conductor labeled OD–3 as well as to the input of pulse amplifier 214. The output of pulse amplifier 214 is amplified by pulse amplifier 215 whose output is further amplified by delay driver 216. The output of delay driver 216 is delayed 1½ µsec. by delay circuit 217 whose output is amplified by pulse amplifier 218. The output of pulse amplifier 218 is delayed 0.2 µsec. by delay circuit 219 whose output after being amplified by pulse amplifier 220 is applied to the conductor labeled OD–3+1.7 µsec.

The output of pulse amplifier 214 is also applied as a pulse input to the ONE side of a flip-flop 221 which has applied to its ZERO input, pulses from the output of pulse amplifier 20. A pulse applied to the ONE input of flip-flop 221 followed 1.7 µsec. later by a pulse on its ZERO input causes that flip-flop to produce a negative going pulse of approximately 1.7 µsec. in duration starting at approximately OD–3 time. This negative going pulse is amplified and inverted by drum write driver 222 whose output is applied to the conductor labeled Status Write Sample.

Pulses on conductor 203 are amplified by pulse amplifier 223 and delay driver 224 whose output is delayed 1½ µsec. by delay circuit 225. The output of delay circuit 225 is amplified by pulse amplifier 226 whose output is delayed ½ µsec. by delay circuit 227. The output of delay circuit 227 is amplified by pulse amplifier 228 whose output is delayed ½ µsec. by delay circuit 229. The output of delay circuit 229 is amplified by pulse amplifier 230 whose output is applied to each of the conductors labeled OD–4 and CD–4.

Pulses on conductor 203 are applied to a gate circuit 231 which is conditioned by the output of a Read Circuit 232. As noted from FIG. 1, the Index Channel read head 43 has its output conductors connected to Timing Circuit 39. As shown in FIG. 8, those conductors are applied as an input to Read Circuit 232.

Read Circuit 232, to be described in detail hereinafter, for the purpose of the immediate description is an electronic device having one input and one output. At the input to the Read Circuit 232 is applied to a continuous substantially sinusoidal waveform having one cycle in every 2,048 cycles which is opposite in phase with respect to the other cycles. The output Read Circuit 232 is positive going gating pulses which ocur each positive slope zero crossing of the sine wave input. The one cycle of the input sine wave which is opposite in phase with the other cycles causes the gate circuit 231 to be conditioned during the time of occurence of a pulse on conductor 203, while the remaining 2,047 cycles cause the gate circuit 231 to be conditioned when no pulse occurs on conductor 203.

The output of gate circuit 231 is amplified by pulse amplifier 233 whose output is applied to the conductor labeled OD–IX.

Waveforms and time of occurrence of the signals on the various input and output conductors of the Timing Circuit of FIG. 8 are shown by curves A through F, K and N in FIG. 2.

*Write Status Circuit*

The Write Status Circuit shown in FIG. 1 as block 37 is shown in logical block schematic form in FIG. 9.

The generation of a Demand pulse, as noted previously, is one of the major functions of the Write Status Circuit. This Demand pulse is generated by the Write Status Circuit each time that an empty register status signal is received by it. An empty register signal has a positive slope zero crossing in its waveform which occurs at OD–1 time and a full register signal has a positive slope zero crossing in its waveform which occurs at OD–3 time. These empty and full register signals are received from the OD Status Channel read head by a Read Circuit 235 (FIG. 9).

Read Circuit 235, to be described in detail hereinafter, for the purpose of the immediate description is an electronic circuit having one input and one output. At the input to the Read Circuit is applied a signal whose wave shape is dependent upon the status signals recorded in the OD Status Channel. In the case of all zeros or all ones in the status channel, the input to the Read Circuit 235 will be a sine wave of 100 kc. per second and in the case of alternating ones and zeros, the input will be a fundamental sine wave of 50 kc. per second with a superimposed 150 kc. per second sine wave. The Read Circuit 235 produces a positive going gate signal during the positive slope zero crossing of the input signal.

FIG. 10 is a family of curves illustrating time relationship between the input and output signals of the Read Circuit. As shown in curves *a* through *d* of FIG. 10, the output gate signal from the Read Circuit brackets the zero crossing point of the input signal. Curve a of FIG. 10 shows a single cycle of input voltage representative of a ONE signal in successive ONE signals or a ZERO signal in successive ZERO signals and curve *b* shows that the positive gate signal brackets the zero crossover of curve *a*. Curve *c* shows the input signal to the Read Circuit in the case of alternate ONE's and ZERO's and curve *d* shows that in this case also the positive gate pulse brackets the zero crossing of the input signal.

In the event that the status signal input to the Read Circuit is representative of a full register, Read Circuit 235 will produce the positive going gate pulse at such a time as to condition the gate circuit 236 to pass the pulse on the conductor labeled OD–1 and this pulse will cause flip-flop 237 to be set in its ZERO state. In the event that the status input signal to the Read Circuit 235 is representative of an empty register, Read Circuit 235 will generate a positive gate signal which will occur at OD–3 time and therefore a pulse on conductor labeled OD–1 will not be passed by the gate circuit 236. It should be noted that a pulse on conductor labeled OD–4 causes flip-flop 237 to be set in its ONE state. Therefore when an empty register signal is received by the Read Circuit 235, flip-flop 237 will remain in its ONE state and will condition a gate circuit 238 through cathode follower 239. Gate circuit 238 in the case of an empty register will therefore be conditioned at the proper time to pass a pulse from the conductor labeled OD–3 to the output conductor labeled Demand through pulse amplifier 240.

The generation of the proper status signal, as noted previously, is another major function of the Write Status Circuit. The Write Status Circuit should generate a Write a One Signal each time a full register signal is received by the Write Status Circuit, should generate a Write a One signal if data is available to be written on the drum, and should general a Write a Zero signal if an empty register signal is received by the Write Status Circuit and no data is available to be written on the drum.

Referring now to FIG. 9, a pulse on the conductor labeled OD–2 causes the flip-flop 241 to be set in its ZERO state and when the flip-flop 241 is in its ZERO state, Gate Circuit 242 is conditioned through cathode follower 243 to pass pulses received from the conductor labeled OD–1. Flip-flop 241 is therefore set in its ZERO state at OD–2 time and in the event that no Demand pulse is generated at OD–3 time, flip-flop 241 will cause the gate circuit 242 to remain conditioned at the next following OD–1 time to pass the OD–1 pulse which sets flip-flop 244 in its ONE state through OR circuit 245. When flip-flop 244 is in its ONE state, a Drum Writer 246 is conditioned through cathode follower 247 to generate a Write a One signal in response to a pulse on the conductor labeled Status Write Sample. It will therefore be seen that when the Read Circuit 235 has received a full register status signal, no Demand pulse is generated and a Write a One signal is generated and applied to the CD Status Channel write head.

If after sending a Demand pulse, a pulse is received on the conductor labeled Data Available, this pulse, through pulse amplifier 248 and OR circuit 245, causes flip-flop 244 to be set in its ONE state. When the flip-flop 244 is in its ONE state, the Drum Writer 246 is conditioned to generate a Write a One signal in response to a pulse on the conductor labeled Status Write Sample. It is therefore seen that if data is available to be written on the Drum, the Write Status Circuit generates a Write a One signal which is applied to the CD status channel write head.

A pulse on the conductor labeled OD–4 causes flip-flop 244 to be set in its ZERO state. Since flip-flop 244 is always set in its ZERO state at OD–4 time, the Drum Writer 246 will generate a Write a Zero signal in response to a Status Write Sample pulse provided that this flip-flop 244 is not pulsed to its ONE state prior to the receipt of the Status Write Sample pulse.

The generation of a Write pulse, as previously noted, is still another major function of the Write Status Circuit. The write signal should be generated only when data is available to be written on the drum. A pulse on the conductor labeled Data Available is applied through pulse amplifier 248 to flip-flop 250 to cause that flip-flop to be set in its ONE state. When the flip-flop 250 is in its ONE state, gate circuit 251 will be conditioned through cathode follower 252 to pass a pulse received from the conductor labeled OD–3 to the output conductor labeled Write. Flip-flop 250 is set in its ZERO state in response to each pulse on the conductor labeled OD–4.

The generation of a pulse on the conductor labeled Clear Write Circuits, as noted previously, is a further major function of the Write Status Circuit. When flip-flop 250 is in its ONE state, a gate circuit 257 is conditioned through cathode follower 253 to pass a pulse on the conductor labeled OD–4 to the output conductor labeled Clear Write Circuits through a pulse amplifier 254. It will therefore be seen that when data is available to be written on the drum, a Write pulse is generated at OD–3 time and a pulse is applied to the conductor labeled Clear Write Circuits at OD–4 time.

The generation of a Drum Full Alarm signal, as previously noted, is still another major function of the Write Status Circuit. A flip-flop 255 is set in its ZERO state by a pulse on the conductor labeled OD–IX and this pulse on the conductor labeled OD–IX is also applied to a gate circuit 256 which is conditioned when flip-flop 255 is in its ZERO state. If flip-flop 255 is initially set in its ONE state in any suitable manner, the first OD index pulse will cause the flip-flop 255 to be set in its ZERO state but due to the inherent delay in flip-flop 255, gate circuit 256 will not be conditioned to pass that index pulse. If between the receipt of any one index pulse and the next following index pulse, the Write Status Circuit has not generated a Demand signal, flip-flop 255 will condition gate circuit 256 to pass that succeeding index pulse to the conductor labeled Drum Full Alarm.

*Control Circuit*

The Control Circuit indicated in FIG. 1 as block 13 is shown in logical block schematic form in FIG. 11.

As previously indicated in the description entitled "General Arrangement," each time a data source produces D.C. levels on its output conductors it produces a pulse on its synchronizing conductor indicating that the D.C. levels on those output conductors are representative of data to be written on the drum. When the Data Source 1 generates D.C. levels on its output conductors of cable 5, its synchronizing pulse on conductor 9 causes a flip-flop 260 (FIG. 11) to be set in its ONE state. When flip-flop 260 is in its ONE state, a gate circuit 261 is conditioned to pass a pulse received from the conductor labeled OD–1 to its output conductor 262. A pulse on the conductor 262 causes a flip-flop 263 to be set in its ONE state and also causes flip-flop 260 to be set in its ZERO state. Flip-flop 260, gate circuit 261 and their associated circuits constitute a synchronizing circuit, that is, irrespective of the time of occurrence of the pulse on the conductor labeled 9, a single pulse occurring at OD–1 time will be applied to the ONE input of flip-flop 263. When flip-flop 263 is in its ONE state, a gate circuit 264 is conditioned to pass a pulse from the conductor labeled Demand to its output conductor 265. A pulse on the conductor 265 causes a flip-flop 266 to be set in its ZERO state and also causes flip-flop 263 to be set in its ZERO state. When flip-flop 266 is in the ZERO state, a gate circuit 267 is conditioned to pass a pulse from the conductor labeled OD–1 to its output conductor 268. A pulse on the conductor labeled 268 causes flip-flop 266 to be set in the ONE state and through OR circuit 269, pulse amplifier 270 and register driver 271 causes a pulse to be applied to the output conductor labeled Data Available.

When flip-flop 266 is in its ZERO state, AND circuits 272 and 273, each of which is a multiple two-way AND, have a positive D.C. level applied to one of their inputs. Those conductors of cable 5 which have a positive D.C. level thereon will, in combination with the positive D.C. level on the other leg of their AND circuits, condition their corresponding gate circuits of gates 274 through OR circuits 275 and cathode followers 276. The other inputs to AND circuits 272 are received from a suitable coding circuit 277 by way of the conductors of a cable 278. Coding circuit 277 may be of any well known type capable of producing a combination of positive and negative D.C. levels on the conductors of cable 278 which will be signals to identify the signals which condition gate circuits 274 as being signals received from the conductors of cable 5.

Briefly summarizing the operation of the Control Circuit thus far described, when the conductors of cable 5 are representative of data to be stored on the drum, a pulse is received on the conductor 9. This pulse causes flip-flop 260 to condition gate circuit 261 to pass the next received OD–1 pulse which sets flip-flop 263 in the ONE state. Flip-flop 263 when in the ONE state causes gate circuit 264 to pass the next received Demand pulse which sets flip-flop 266 in the Zero state.

When flip-flop 266 is in the ZERO state the positive D.C. levels on the conductors of cable 5 and the positive D.C. levels from coding circuit 277 condition their corresponding gate circuits of gates 274. Also when flip-flop 266 is in the Zero state gate circuit 267 is conditioned to pass the next received OD–1 pulse to the output conductor labeled Data Available which is delivered to Write Status Circuit of FIG. 1 and this same data available pulse causes gates 274 to produce an output pulse on the conductors of cable 15 if the particular gate of gates 274 has been conditioned. In this manner the D.C. levels on the conductors of cable 5 representative of data and the D.C. levels from the Coding Circuit 277 representing identification are converted into data pulses on the conductors of cable 15 and a Data Available pulse is delivered to the Write Status circuit of FIG. 1 when Data Source 1 has produced data and a Demand pulse has been received from the Write Status Circuit of FIG. 1.

When Data Source 3 has produced D.C. levels on its output conductors of cable 7 representative of data, the synchronizing pulse on conductor 11 causes a flip-flop 280 to be set in its ONE state which conditions a gate circuit 281 to pass the next received pulse on the conductor labeled OD–1 to its output conductor 282. A pulse on conductor 282 causes a flip-flop 283 to be set in its ONE state and also causes flip-flop 280 to be set in its ZERO state. When flip-flop 283 is in its ONE state a gate circuit 284 is conditioned to pass the next pulse received on conductor 285 to its output conductor 286.

As previously noted in the description entitled "General Arrangement," data from Data Source 3 of FIG. 1 will be written on the drum provided that when the Control Circuit receives a Demand pulse no information is available to be transferred from Data Source 1. As will be noted in FIG. 11, flip-flop 263 will be in its ZERO state when no data is available to be transferred from Data Source 1 since under that condition no synchronizing pulse is received on conductor 9. When flip-flop 263 is in the ZERO state, a gate circuit 287 is conditioned to pass the next received pulse on the conductor labeled Demand to the conductor 285. This pulse on conductor 285 is passed by gate circuit 284 if data is available to be transferred from Data Source 3 to conductor 286. A pulse on conductor 286 causes a flip-flop 288 to be set in its ZERO state and also causes flip-flop 283 to be set in its ZERO state. When flip-flop 288 is in the ZERO state a gate circuit 289 is conditioned to pass the next received pulse on the conductor labeled OD–1 to the output conductor labeled Data Available through OR circuit 269, pulse amplifier 270 and register driver 271. When flip-flop 288 is in the ZERO state, AND circuits 290 and 291, each of which is a multiple two-way AND, have a positive D.C. level applied to one of their inputs. Those conductors of cable 7 which have a positive D.C. level thereon will, in combination with the positive D.C. level on the other leg of their AND circuits, condition their corresponding gate circuits of gates 274 through OR circuits 275 and cathode followers 276. The other inputs to AND circuits 291 are received from a suitable Coding circuit 292 by way of the conductors of a cable 293. Coding circuit 292 may be identical in construction to the Coding Circuit 277. However, Coding Circuit 292 produces a combination of positive and D.C. levels on the conductors of cable 293 which will be signals to identify the signal which condition the gates 274 as being signals received from the conductors of cable 7.

Briefly summarizing the operation of that part of the Control Circuit of FIG. 11 related to control of data from the conductors of cable 7, when the conductors of cable 7 are representative of data to be stored on the drum, a pulse is received on the conductor 11. This pulse causes flip-flop 280 to condition gate circuit 281 to pass the next received OD–1 pulse which sets flip-flop 283 in the ONE state. Flip-flop 283 when in the ONE state causes gate circuit 284 to pass the next received pulse on the conductor 285 which sets flip-flop 288 in the ZERO state. No pulse will be received on conductor 285 unless data is not available to be transferred from Data Source 1. When flip-flop 288 is in the ZERO state the positive D.C. levels from the conductors of cable 7 and the Coding Circuit 292 cause their corresponding gate circuits of gates 274 to be conditioned. When flip-flop 288 is in the ZERO state gate circuit 289 is conditioned to pass the next received OD–1 pulse to the output conductor labeled Data Available and this Data Available pulse also causes the gate circuits of gates 274 which have been conditioned to produce pulses on their corresponding conductors of cable 15. In this manner when data is available to be transferred from Data Source 3 and no data is available to be transferred from Data Source 1, the next received Demand pulse will cause the D.C. level signals on the conductors of cable 7 and the D.C. level signals from Coding Circuit 292 which are representative of identification to be transformed into pulse signals on the conductors of cable 15, and a Data Available pulse is delivered from the Control Circuit to the Write Status Circuit.

*Write Circuit*

The Write Circuit indicated in FIG. 1 by the block symbol 17 is shown in simplified logical block schematic form in FIG. 12. The Write Circuit includes several identical stages, one stage for each bit of data to be written on the drum. In the illustrated preferred embodiment since 32 parallel bits of data are to be written on the drum, the Write Circuit includes 32 identical stages. In the interest of simplicity only stages 1, 2, 31 and 32 have been shown. However the drawing in view of the following description will make it apparent how the remaining stages are connected and how they operate.

Stages 1, 2, 31 and 32 each include a drum writer, two cathode followers and a flip-flop interconnected in the manner illustrated in FIG. 12. A pulse on conductor labeled Clear causes each of the flip-flops 300 through 303 to be set in their ZERO state through register driver 304. Flip-flops 300 through 303 have their ONE output connected through cathode followers 305 through 308 respectively to drum writers 309 through 312 respectively and have their ZERO outputs connected through cathode followers 313 through 316 respectively to the Drum Writers 309 through 312 respectively. If any one of flip-flops 300 through 303 receives a pulse input from its corresponding conductor of cable 15, that flip-flop will be set in the ONE state and the Drum Writer corresponding to that flip-flop will generate a Write a ONE signal in response to a pulse on conductor 317. In this manner the binary signals on the conductors of cable 15 will be applied to the drum writing heads in response to a pulse on conductor 317.

Each time a word is to be written on to the drum, a Write pulse is generated. In response to a pulse on the conductor labeled Write, a flip-flop 318 is set in the ONE state. This Write signal, if generated, will occur at OD–3 time, and an OD–3+1.7 μsec. pulse causes flip-flop 318 to be reset in the ZERO state. This sequence of pulses causes a negative pulse on the ZERO output of flip-flop 318 which has a duration of 1.7 microseconds. The output negative pulse from flip-flop 318 is suitably amplified and inverted by a Drum Write Driver 319 whose output is applied to the conductor 317.

*Read Status Circuit*

The Read Status Circuit indicated in FIG. 1 by block symbol 53 is shown in logical block schematic form in FIG. 13. The generation of a Read Sample pulse, as previously noted, is a major function of the Read Status Circuit. This Read Sample pulse should be generated by the Read Status Circuit only when a full register signal is received from the CD Status Channel read head, and a positive D.C. level is received on the conductor labeled Read. Signals from the CD Status Channel read head are applied as an input to a Read Circuit 330. Read Circuit 330, to be described in detail hereinafter, for the purpose of the immediate description is an electronic circuit having one input and one output. At the input to the Read Circuit is applied a signal whose wave shape is dependent on the status signals recorded in the CD Status Channel. In the case of all ZERO's or all ONE's in the Status Channel, the input to the Read Circuit 330 will be a sine wave of 100 kc. per second and in the case of alternating ONE's and ZERO's, the input is a fundamental sine wave of 50 kc. per second with a superimposed 150 kc. per second sine wave. The Read Circuit 330 produces a positive going gate signal during the positive slope zero crossing of the input signal.

In the event that the status signal input to the Read Circuit 330 is representative of a full register, Read Circuit 330 will produce the positive going gate pulse at such a time as to condition a gate circuit 331 to pass the next received pulse on the conductor labeled CD–1 and this pulse is applied as an input to a gate circuit 332. Gate circuit 332 is conditioned to pass pulses by a positive D.C. level on the conductor labeled Read and therefore if instructed to Read and a full register signal from the CD Status Channel read head is received, a pulse will be applied to the output conductor labeled Read Sample.

The generation of the proper status signal to be recorded in the OD Status Channel, as previously noted, is another major function of the Read Status Circuit. The Read Status Circuit should, if instructed to Read by receiving a positive D.C. level on the conductor labeled Read, generate a Write a ZERO signal for each status signal to be recorded in the OD Status Channel. If not instructed to Read (receiving a negative D.C. level on the conductor labeled Read) the Read Status Circuit should generate a Write a ZERO signal in response to each ZERO signal received from the CD Status Channel read head and a Write a ONE signal in response to each ONE signal received from the CD Status Channel read head.

A flip-flop 333 is set to its ZERO state in response to a pulse on the conductor labeled CD-4 and is set in its ONE state in response to a pulse from the output of a Gate Circuit 334. When flip-flop 333 is in its ONE state, a Drum Writer 335 is conditioned through a cathode follower 336 to generate a Write a ONE signal in response to a pulse received from the conductor labeled Status Write Sample. When flip-flop 333 is in its ZERO state, Drum Writer 335 is conditioned through a cathode follower 337 to generate a Write a ZERO signal in response to a pulse received from the conductor labeled Status Write Sample.

When the drum is instructed to Read, a positive D.C. level is received on the conductor labeled Read which is inverted to a negative D.C. level by an inverter circuit 338. This negative D.C. level is applied to the gate circuit 334 and prevents pulses from being passed by that gate circuit. Therefore when the drum is instructed to Read, flip-flop 333 remains in its ZERO state which causes a Write a ZERO signal to be generated by Drum Writer 335 in response to each Status Write Sample pulse.

If the drum is not instructed to read, a negative D.C. level is received on the conductor labeled Read which is inverted to a positive D.C. level by inverter circuit 338. This positive D.C. level conditions gate circuit 334 to pass each pulse received from the output of gate circuit 331. Each CD-4 pulse causes flip-flop 333 to condition Drum Writer 335 to generate a Write a ZERO signal in response to a Status Write Sample pulse. If a ZERO signal is received by Read Circuit 330, no pulse will be produced by gate circuit 331 and therefore flip-flop 333 will remain in its ZERO state and the Drum Writer 335 will generate a Write a ZERO signal in response to the next Status Write Sample pulse. However, if a ONE signal is received by Read Circuit 330, a pulse will be passed by gate circuits 331 and 334 to cause flip-flop 333 to condition Drum Writer 335 to generate a Write a ONE signal in response to the next received Status Write Sample pulse.

*Read Circuits and Sample Gates*

The Read Circuits and Sample Gates indicated in FIG. 1 by block symbol 29 are shown in simplified logical block schematic form in FIG. 14.

The Read Circuits and Sample Gates element includes several identical stages. In the illustrated preferred embodiment, since 32 parallel bits of data are to be written on the drum, the Read Circuits and Sample Gates element includes 32 identical stages. In the interest of simplicity only stages 1, 2, 31 and 32 are shown. However the drawing in view of the following description will make it apparent how the remaining stages are connected and how they operate.

Stages 1, 2, 31 and 32 each include a Read Circuit and associated sample gate interconnected in the manner illustrated in FIG. 14. The input to each of the Read Circuits 350 through 353 is a signal whose wave shape is dependent upon the signals recorded on the drum which are read by the Read Head corresponding to the particular Read Circuit. In the case of all ZERO's or all ONE's in the channel being considered, the input to the Read Circuit will be a sine wave of 100 kc. per second and in the case of alternating ONE's and ZERO's, the input will be a fundamental sine wave of 50 kc. per second with a superimposed 150 kc. per second sine wave. Each of the read circuits 350 through 353 produces a positive going gate signal during the positive slope zero crossing of its input signal.

The output of each of Read Circuits 350 through 353 is connected to its corresponding gate circuit of gate circuits 354 through 357. If the signal into any of the Read Circuits 350 through 353 is representative of a binary ONE, that Read Circuit will condition its associated gate circuit at the proper time to pass a pulse, received from the output of a Register Driver 358, to its output conductor of cable 31.

Register Driver 358 receives pulses from the conductor labeled Read Sample and delivers those pulses to the pulse input of gate circuits 354 through 357.

*Temporary Storage Register*

The Temporary Storage Register indicated in FIG. 1 by block symbol 33 is shown in simplified logical block schematic form in FIG. 15.

The Temporary Storage Register includes several identical stages. Since 32 parallel bits of data are to be handled by the Temporary Storage Register in the illustrated preferred embodiment, that register includes 32 identical stages. In the interest of simplicity, only stages 1, 2, 31 and 32 are shown. However, the drawing in view of the following description will make it apparent how the remaining stages are connected and how they operate.

Stages 1, 2, 31 and 32 each include a flip-flop and associated gate interconnected in the manner illustrated in FIG. 15. Each of the flip-flops 360 through 363 is cleared to its ZERO state by receiving a pulse from the conductor labeled Clear through a Register Driver 364 and set to its ONE state by receiving a pulse from its associated conductor of cable 31.

Each of the flip-flops 360 through 363, when in its ONE state, conditions its corresponding gate circuit of gate circuits 365 through 368 to pass a pulse received from the output of a register driver 369 to its associated output conductor of cable 35. Register Driver 369 receives pulses from the conductor labeled Temporary Storage Register to Data Processing Machine.

As noted in the above description entitled "General Arrangement," when the Read Circuits and Sample Gates 29 receive a Read Sample pulse, that same pulse is delivered to the Data Processing Machine and pulses are generated on the conductors of cable 31 which correspond to a ONE read from the drum. These generated pulses are received by the flip-flops 360 through 363 (FIG. 15) and are set to states representing the word of data read from the drum. In response to the pulse on the conductor labeled Read Sample, the Data Processing Machine generates a pulse on the conductor labeled Temporary Storage Register to Data Processing Machine and will then receive pulses on the conductors of cable 35 representative of the word of data stored in the Temporary Storage Register.

*Time Pulse Generator*

The Time Pulse Generator indicated in FIG. 8 by the block symbol 201 labeled TPG is shown in wiring schematic diagram form in FIG. 16. The Time Pulse Generator, or zero crossing detector, as shown by block symbol 201 of FIG. 16 has one input which is applied to terminals 380 and 381 and two outputs, one at terminal 382 and the other at terminal 383.

At the input to the Time Pulse Generator is applied a continuous sinusoidal waveform which so conditions the generator as to allow the production of short duration pulses at each of the input signal's zero crossings. One output exhibits pulses during positive slope zero crossings while the other output occurs during negative slope zero crossings of the input signal.

Nominal operation of the TPG is realized by the application of a 100 kc. 175 millivolt peak to peak sinusoid cross the terminals 380 and 381 from which are generated positive going, 30 volt, .1 microsecond, half sine pulses at terminals 382 and 383. Each output delivers a pulse at alternate input signal zero crossings and the separate outputs occur at alternate zero crossings. The pulses from each of the outputs, regardless of delays, occur at a pulse repetition frequency equal to the frequency of the input sinusoid and the two outputs are separated by a time interval equal to the reciprocal of twice the input signal's frequency.

Thus a timing track, a closed 100 kc. sinusoid, written around the periphery of a drum surface under a single read head, or in a single channel, can determine the location of axially positioned registers around the drum surface. A time pulse generator applied to this timing track produces "read" and "write" command pulses that are accurately timed with respect to each other and to the timing track signals so that the functions of reading and writing on a particular register may take place at the proper times relative to that register's location.

The time pulse generator, shown in wiring schematic form in FIG. 16, consists mainly of a phase splitting input transformer T–7 from which two parallel branches of amplification and pulse shaping follow. Each branch contains two amplification stages, a 0.5 microsecond peaker, 0.2 microsecond peaker, a 0.1 microsecond pulse standardizer and 0.1 microsecond power amplifier. The corresponding first three stages of the two branches are capacitively cathode coupled to eliminate amplitude distortion and to preserve the identity of the zero crossings of the original signal.

The sine wave input to terminals 380 and 381 of the input transformer T–7, amplified by a factor of five, appears at terminals 384 and 385; the sinusoid at terminal 384 is 180° out of phase with that at terminal 385 and those sinusoids have equal amplitudes with respect to ground. The sine wave at terminal 384 is applied to the control grid of a vacuum tube triode section **V1*a* through a parasitic suppressor resistor 386 while that at terminal 385 is similarly applied through parasitic resistor 387 to the control grid of tube section V1*b*. Resistor 388 in the cathode circuit of tube V1*a* is a cathode degenerating resistor which allows, by virtue of its magnitude and the voltage to which it is returned, an accurately determined amount of quiescent plate current to flow and fixes an operating point which is dependent upon the amplification factor of the tube. Resistor 389 performs a similar function for tube V1*b*. The roles of resistors 390 and 391, and of resistors 392, 393, 394 and 395 located at tubes V2 and V3 respectively are identical to the role played by resistor 388. Capacitor 396, connected between the cathodes of the two sections of tube V1** presents a very low impedance to 100 kc. signals and therefore connects the two cathodes together at the signal frequency so that the magnitudes of the varying plate currents of tubes V1*a* and V1*b* tend to be the same and differ only in that one is 180° out of phase with respect to the other. If the instantaneous plate currents tend to differ due to amplitude distortion in the separate triodes, a charge thusly appearing across capacitor 396 tends to make them equal. The amplified signals appearing at the plates of tube V1 have substantially equal positive and negative excursions so that in the capacitively coupling of these signals to another and identical stage, the zero crossings of the original input signal are preserved, that is, the zero crossings appear at **1/2*f* microseconds apart. The stage consisting of the two sections of tube V1** and its circuitry is therefore a push-pull amplifier and so effective is this method of obtaining push-pull operation that either triode section of this stage may go almost completely dead or either control grid may be grounded without seriously affecting the overall operation of the Time Pulse Generator.

Capacitors 397 and 398 of tubes V2 and V3 respectively perform identical functions as capacitor 396 of tube V1. The second stage in each of the parallel branches of the Time Pulse Generator is substantially identical to the first stage of those branches. The signal gain in the first and second stages of each parallel branch is sufficiently large that the magnitude of the signals applied to the control grids of tube sections 3V*a* and 3V*b* is very much greater than the grid base of the tubes of that stage. The time rate of change of voltage at the zero crossings of the input signal to the third stage, during the region of the grid base of the tubes of that stage, is sufficiently large so that the total time variation of the output pulses is less than 0.2 microsecond for signal variations of 80 to 120 kc. and 50 to 300 millivolts. The small size of the peaking chokes L1 and L2 and the shunting diode circuits allow the conducting tube's cathode to follow the positive going input signal thus preventing pulse time shifts due to grid current flow.

During positive going excursions of the signals applied to the control grid of tube section V3*a* and tube section V3*b*, the ON tube behaves like a cathode follower having as its cathode impedance the Thevenin equivalent of resistors 392 through 395 and capacitor 398.

During negative going excursions through the zero crossing of the input signal to the grids of tube sections V3*a* and V3*b*, the triode receiving this negative going excursion is rapidly cut off, thus producing a positive output pulse of a duration controlled by the L and C at the plate of the triode and of an amplitude determined by the above and the time rate of change of switching the tube's plate current OFF. As the inputs to the control grids of tube sections V3*a* and V3*b* are 180° out of phase, the triodes exchange their roles of cathode follower and peaker twice each input cycle. Hence while one triode section is ON, the other is OFF. Cutting a triode section OFF is accomplished in a rapid manner by a positive going excursion at its cathode due to the cathode follower action of the other section and by a negative going excursion at its grid. The negative pulses at the ON tube's plate are partially suppressed by the diode and resistor damping combinations of diode 400 and resistor 401 across L1 and diode 402 and resistor 403 across L2. Since the output pulses from the third stages depend in amplitude on the time rate of change of input (i.e., timing channel frequency and amplitude) in addition to the inductance and capacitance at the plate, the output of the peakers is made much larger in amplitude (in the worst case) than the grid base of the succeeding stage. Consequently the pulse width is also fairly large, i.e. approximately 0.5 microsecond.

The signals at the anodes of tube sections **V3*a* and V3*b* are coupled to the grids of tube sections V4*a* and V4*b*** respectively through R-C coupling networks. The quiescent voltage of tube sections V4*a* and V4*b* is approximately negative 7.5 volts which is more than sufficient to insure cut off of those triodes. Since the cathodes of tube sections V4*a* and V4*b* are connected directly to ground and since the signals applied to those tube sections have relatively large magnitude, i.e., approximately 15 volts, the triode sections conduct grid current. Thus the peaks of the pulse inputs to the grids of tube sections V4*a* and V4*b* are effectively clamped to approximately ground while the base line of the pulses shifts downward to accommodate this clamp. This allows all inputs to tube sections V4*a* and V4*b* to produce equal effects regardless of amplitude.

The 0.2 microsecond peaker stages including tube sections V4*a* and V4*b* together with their associated circuits standardize the width of the pulses issuing from the 0.5 microsecond peaker stages including tube sections **V3*a*** and V3*b* by producing output pulses approximately 0.2 microsecond wide. The 1 to 1 pulse transformers T–1 and T–2 at the plates of tube sections **V4*a* and V4*b*** allow positive pulses to be generated at their output terminals from the production of negative pulses at the plates of tube sections V4*a* and V4*b*. The germanium diodes 404 and 405 placed across the primaries of those transformers suppress overshoots which would result from the ringing of the transformers. The inductors L3 and L4 placed across the secondaries of the pulse transformers help to determine the width of the pulses generated at these stages.

The 5th stages of of the Time Pulse Generator are composed of pulse standardizing amplifiers consisting essentially of gate tubes V5 and V7 and pulse transformers T–3 and T–4 respectively. The gate tubes are tetrode connected by parasitic suppressor resistors 406 and 407. The control grid of V5 and the control grid of V7 are returned to negative 15 volts which insures cutoff of the gate tubes. The transfer characteristics of those pulse amplifiers is such that, together with the preceding and remaining stages of the TPG, output pulses do not occur for timing track input signals of less than 35 millivolts whereas standard pulses are obtained for inputs of 50 millivolts and over. The power amplifier stages comprising tubes V6 and V8 together with their associated circuits receive 0.1 microsecond pulses from their preceding stages at a bias level of −30 volts. Since cutoff of tubes V6 and V8 is negative 15 volts, noise pulses of up to 15 volts in magnitude are completely rejected by the power amplifier stages.

*Drum Write Driver*

The Drum Write Driver indicated in FIG. 8 by the block symbol 222, and in FIG. 12 by the block symbol 319, is illustrated in wiring schematic diagram form in FIG. 17. The input to the Drum Write Driver is a negative going pulse approximately 1.7 microseconds in duration having an amplitude varying from +10 to −30 volts. The Drum Write Driver supplies a positive pulse of about 1.8 microseconds in width and 55 volts in amplitude from a −45 volt base line to the Drum Writer. The input pulse is applied to an amplifier circuit including tubes V1 and V2 and their associated circuits. In this amplifier stage the square wave input pulse is amplified and inverted before it is applied to a power cathode follower circuit including tubes V3 and V4 and their associated circuits.

From the plates of tubes V1 and V2 the positive square wave is applied by means of capacitor 415 to the grids of tubes V3 and V4 which together with their associated circuits comprise power cathode followers. In the grid circuit of this parallel cathode follower stage the input level is set at +10 volts and −110 volts by a circuit including diodes 410 through 413 which are connected between a +10 volts source and a −150 volts source in the manner illustrated in the drawing. The −110 volt input insures cutoff of tubes V3 and V4 whose cathodes are connected through resistors to a −150 volt source. The +10 volt input to the parallel cathode followers insures, as a result of bias build up, at least +10 volts output. Capacitor 415 which provides A.C. coupling between the amplifier and cathode follower stages blocks D.C. and thereby prevents a D.C. output from the Drum Write Driver in the event that the input signal to the Drum Write Driver is a constant −30 volts signal. If the flip-flop which drives the Drum Write Driver should upon turning power on, produce a negative D.C. level to the Drum Write Driver and this negative D.C. level were passed by the Drum Write Driver through the subsequent circuits to the drum heads, a D.C. erase of the drum surface adjacent to that particular head would result. Capacitor 415 therefore effectively performs a function of preventing the drum heads from being energized by a steady state signal which would result in drum erase. An output from the Drum Write Driver can only be realized by a negative going transition at the input. Hence if the input were at first −30, it would then have to be brought to the normal condition of +10 before the Drum Write Driver is conditioned to function.

*Read Circuit*

The Read Circuit indicated in FIG. 8 by block symbol 232, in FIG. 9 by block symbol 235, in FIG. 13 by block symbol 330 and in FIG. 14 by block symbols 350 through 353, is shown in wiring schematic form in FIG. 18. At the input to the Read Circuit is applied a signal whose wave shape is dependent upon the signals recorded on the drum in the channel associated with the Read Circuit and whose peak to peak amplitude may vary between 50 and 300 millivolts at end of life. In the case of all ZERO's or all ONE's in the status channel, the input to the Read Circuit will be a sine wave of 100 kc. per second and in the case of alternating ONE's and ZERO's the input will be a fundamental sine wave of 50 kc. per second with a superimposed 150 kc. per second sine wave. The Read Circuit produces a positive going gate signal during the positive slope zero crossing of the input signal. As indicated above with respect to the section of the description entitled "Write Status Circuit," FIG. 10 is a family of curves illustrating the time relationship between the input and output signals of the Read Circuit. Curves *a* and *b* of FIG. 10 illustrate input and output signals when the input signal is representative of continuous ONE's or ZERO's whereas curves *c* and *d* represent input and output signals when the input signal is representative of alternate ONE's and ZERO's.

Signals from the drum read head are applied to an initial amplifier circuit including tube V1 and its associated circuit. Tube V1, a low microphonic type 6072 tube, has its output applied through a cathode follower stage including tube section V2*a* and its associated circuit to a differentiator stage including tube section V2*b* and its associated circuit. This differentiator stage produces an amplification that is proportional to frequency and causes a constant 90° phase shift so that sampling of read signals can occur at the signal's zero crossings. The output of the differentiator stage is further amplified and clipped by the amplifier stage including tube section V3*a* and then coupled to the load circuit through an output cathode follower stage including tube section V3*b* and its associated circuit. The overdriven amplifier stage including tube section V3*a* and its associated circuit is not affected by any negative signal of an amplitude less than 1.7 volts. With a positive grid swing, the normal cathode potential is +1.7 volts at a steady 6 ma. current. However, when the grid goes negative the cathode tries to follow the grid potential but is clamped at ground by a diode 426. The grid of tube section V3*a* continues its negative excursion to cutoff thereby clipping the negative portion of the waveform. Consequently a positive square wave is produced at the anode of V3*a* for each negative cycle of input applied to its grid and will cause a +10 volt output gating voltage only if the read head signals exceed about 50 millivolt peak to peak. The signal at the anode of tube section V3*a* is applied to the control grid of tube section V3*b* which together with its associated circuit forms a cathode follower, the output of which is clamped at +10 and −30 by diodes 427 and 428.

*Drum Writer*

The Drum Writer which is indicated in FIG. 9 by block symbol 246, in FIG. 12 by block symbols 309 through 312 and in FIG. 13 by block symbol 335 is shown in wiring schematic diagram and block symbol form in FIG. 19. The block symbol of a Drum Writer is shown in FIG. 19 as having a pulse input applied to its input terminal 450, a D.C. level of +10 or −30 applied to its input terminal 451 and a +10 or −30 D.C. level applied to its input terminal 452. If a positive D.C. level of +10 volts is applied to terminal 452 and a negative D.C. level of 30 volts is applied to terminal 451, the Drum Writer in response to a Write Sample pulse applied to terminal 450 will produce a Write a ZERO signal on its output conductors 453 and 454. If a negative D.C. level of 30 volts is applied to the input terminal 452 and a positive D.C. level of 10 volts is applied to terminal 451 the Drum Writer will produce, in response to a Write Sample pulse at its input terminal 450, a Write a ONE signal on its output conductors 453 and 454. The Write a ONE signal causes the magnetic head energized by it to produce a flux of one polarity whereas a Write a ZERO signal causes the head to produce a flux of opposite polarity.

Each section of tube V1 has applied to its grid a negative 30 volt or a positive 10 volt signal from its respective output of the flip-flop associated with the Drum Writer. If the flip-flop is in the ZERO state, V1*a* will have a grid to cathode bias of positive 10 volts and V1*b* will have a grid to cathode bias of negative 30 volts. This will result in tube section V1*a* conducting and tube section V1*b* non-conducting and a more positive potential applied to the grid of tube section V2*b* than that applied to the grid of tube section V2*a*; however, neither of those tube sections will conduct as a result of those potentials. Under these conditions, a pulse applied to the input terminal labeled Write Driver Input will cause tube section V2*b* to conduct and produce an output pulse herein referred to as a Write a ZERO signal.

If the flip-flop associated with the Drum Writer is in the ONE state, V1*a* will have a grid to cathode bias of negative 30 volts and V1*b* will have a grid to cathode bias of positive 10 volts. This will result in tube section V1*b* conducting and tube section V1*a* non-conducting and a more positive potential applied to the grid of tube section V2*a* than that applied to the grid of tube section V2*b*; however, neither of those tube sections will conduct as a result of those potentials. Under these conditions, a pulse applied to the input terminal labeled Write Driver input will cause tube section V2*a* to conduct and produce an output pulse herein referred to as a Write a ONE signal.

*Delay Driver*

The Delay Driver circuit indicated by block symbols 206, 216 and 224 in FIG. 8 is shown in wiring schematic and block symbol form in FIG. 20.

The Delay Driver circuit is so constructed as to permit a 0.1 μsec. pulse to be amplified to a sufficient level to drive a delay line. The Delay Driver employs a coupling arrangement including a 1 to 3 loose coupled transformer 500 having a primary winding 501 and a secondary winding 502 which supplies input pulses to a control grid 503 of tube 504 through resistor 505. The other end of the secondary winding 502 is connected to a negative 30 volt D.C. source through resistor 506. Diode 507 and resistor 508 are employed across the secondary winding 502 to reduce positive overshoot in the grid voltage.

A transformer 509, which is a tight coupled 4 to 1 step down transformer, is employed to obtain desirable transfer characteristics under heavy loads and to obtain maximum power transfer by increasing the current delivery to the load according to the turns ratio of the transformer.

A 0.1 μsec. positive pulse applied to the input of transformer 500, causes the Delay Driver to yield a positive pulse at its output terminals having sufficient power to drive a delay line.

*Model D Cathode Follower*

The Model D Cathode Follower is essentially the same as the cathode follower circuit illustrated and described in Ross et al. Patent No. 2,914,248 issued Nov. 24, 1959 for "Program Control for a Data Processing Machine." The only difference between the Model D cathode follower and the Model B, C and F cathode followers described in the referred to application is that the value of the cathode resistor $R_k$ in the model D cathode follower is 31.2K ohms.

*Model C Flip-Flop*

The model C flip-flop indicated by block symbol 255 in FIG. 9 and block symbols 260, 263, 266, 280, 283 and 288 in FIG. 11 is shown in wiring schematic and block symbol form in FIG. 21.

The model C flip-flop is a bi-stable element having three inputs labeled set, clear and complement to which are applied positive, 0.1 μsec., half-sine 20 to 40 volt pulses. A pulse applied to the set input terminal causes the flip-flop to assume one of its stable states to produce a positive 10 volt D.C. level output on its ONE output conductor while producing a negative 30 volt D.C. level output on its ZERO output conductor. A pulse applied to the clear input terminal causes the flip-flop to assume its other stable state to produce a positive 10 volt D.C. level output on its ZERO output conductor while producing a negative 30 volt D.C. level output on its ONE output conductor. A pulse applied to the Complement input terminal causes the flip-flop to assume the stable state which is opposite to the stable state that it was in prior to the receipt of the complement pulse.

The flip-flop includes two sections of a 5965 twin triode. The anodes of that tube are cross-coupled to the control grids in the manner shown in the drawing. One of the tube sections is conducting and the other non-conducting except during a transition state when both sections may be non-conducting momentarily.

A positive input pulse applied to the primary winding 550 of a 1 to 1 transformer 551 establishes a negative pulse on the secondary winding 552. The secondary winding 552 is serially connected with a diode 553 and resistor 554 between the grid 555 and cathode 556. All of this negative pulse is passed by the diode 553 provided the potential on its anode is positive with respect to its cathode. When the section *a* of the tube is non-conducting, its grid potential is at or below cutoff, and a negative pulse, whether passed by diode 553 or not, does not affect the non-conducting state of this tube section. If the section *a* of the tube is conducting, its grid bias potential is approximately zero volts or slightly positive which conditions diode 553 to the threshold of conducting. A negative pulse across the secondary winding 552 now causes the potential at the cathode of diode 553 to go further negative; whereupon the diode 553 passes the negative pulse to the grid 555 and stops conduction of section *a* of the tube. A diode 557 is connected across the secondary winding 552 to dissipate and limit positive overshoot voltages which occur on the upper side of that winding as a result of the decay of a pulse on the primary winding.

In like fashion a positive pulse applied to the primary winding 558 of a transformer 559 establishes a negative pulse on the secondary winding 560 which is passed by a diode 561 through a resistor 562 to grid 563 whenever section *b* of the tube is conducting. A diode 564, connected across secondary winding 560, serves to dissipate and limit positive overshoot voltages which occur on the upper side of the secondary winding 560 as a result of the decay of a positive pulse on the primary winding 558.

In order to illustrate the operation of the flip-flop, assume a positive pulse is applied to the primary winding 550 of the transformer 551 when tube section *a* is conducting. The diode 553, which is at the threshold of conduction because the grid bias of tube section *a* is zero or slightly positive, passes the resulting negative pulse, produced across the secondary winding, to the grid 555. As the grid 555 goes negative beyond cutoff, the potential at the anode of tube section *a* rises toward +0.5 volt. This positive going potential is coupled through a resistor 565 and a capacitor 566 to the grid 563 and initiates conduction in tube section *b* as soon as its grid potential rises above the cutoff potential. As current conduction commences in the tube section *b*, its anode potential starts decreasing from +0.5 volt until at full conduction it reaches −77 volts. This decreasing potential at the anode of tube section *b* is coupled through a resistor 567 and a capacitor 568 to grid 555 and maintains that grid below the cutoff potential. In this condition with tube section $b$ conducting and tube section $a$ non-conducting, the flip-flop is said to be in its ONE state producing a positive 10 volt D.C. level at its ONE output and a negative 30 volt D.C. level at its ZERO output.

If a positive pulse is now applied to the primary winding 558 of transformer 559, the resulting negative pulse across the secondary winding 560 is passed by the diode 561 and applied through resistor 562 to the grid 563. As the grid 563 goes negative beyond cutoff, the potential at the anode of tube section $b$ rises toward +0.5 volt. This positive going potential is coupled through the resistor 567 and capacitor 568 to the grid 555 and initiates conduction in tube section $a$ as soon as its grid potential rises above cutoff potential. As current conduction commences in tube section $a$, its anode potential starts decreasing from +0.5 volt until at full conduction it reaches −77 volts. This decreasing potential at the anode of tube section $a$ is coupled through resistor 565 and capacitor 566 to the grid 563 and maintains that grid below the cutoff potential. In this condition with tube section $a$ conducting and tube section $b$ non-conducting, the flip-flop circuit is said to be in its ZERO state producing a positive D.C. level at its ZERO output and a negative 30 volt D.C. level at its ONE output.

The flip-flop circuit shown in FIG. 21 has the characteristic that even if one of its output terminals should become shorted, the circuit will respond to input pulses and the output at its un-shorted circuit output will not be affected by the short.

The complement input terminal of the flip-flop is connected by way of diodes 569 and 570 to the primary windings of transformer 551 and 559, respectively. A pulse applied to this complement input terminal will therefore cause the flip-flop to assume the stable state opposite to the state in which it was prior to receipt of the complement pulse.

*D.C. Inverter*

The model A Inverter Circuit indicated by block symbol 338 in FIG. 13 is shown in wiring schematic and block symbol form in FIG. 22.

The D.C. inverter circuit receives either a positive D.C. level or a negative D.C. level and converts those levels to a negative 30 volt D.C. level and a positive 10 volt D.C. level, respectively. The positive D.C. level input may have a magnitude from approximately 12 volts to 0 volt and the negative D.C. level input may have a magnitude from approximately −30 volts to −8 volts.

The input signal is applied to the control grid of section V1$a$ of a twin triode 5965 whose output is coupled to the control grid of tube section V1$b$. Tube section V1$b$ and its associated circuit form a cathode follower and clamping circuit. A complete operational description and analysis of the cathode follower circuit and diodes 590, 591 and 592 will be found in Crawford Patent No. 2,906,871 issued Sept. 29, 1959, for "Diode Clipping Circuit."

*Model B Register Driver*

The model B Register Driver indicated by block symbol 304 in FIG. 12, block symbol 358 in FIG. 14, and block symbols 364 and 369 in FIG. 15, is shown in wiring schematic and block symbol form in FIG. 23.

The model B register driver receives a positive, 0.1 μsec. pulse and delivers that pulse at each of its two outputs with sufficient power to simultaneously pulse several flip-flops or gate circuits.

*Other Basic Circuits*

Each of the following Basic Circuits may be of the type illustrated and described in Ross et al. Patent No. 2,914,248, issued Nov. 24, 1959, for "Program Control for a Data Processing Machine."

| Title | Abbreviation | Description Column No. | Figure |
|---|---|---|---|
| Model A Flip-Flop | $_A$FF | 55–59 | 45 |
| Gate Circuit | GT | 59 | 46 |
| Model A Pulse Amplifier | $_A$PA | 60 | |
| Model B Pulse Amplifier | $_B$PA | 59–60 | 47 |
| Delay Unit | D | 63 | 51 |
| OR Circuit | OR | 61–63 | 50 |
| AND Circuit | AND | 63 | |
| Model A Register Driver | $_A$RD | 60 | 48 |

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A data storage system comprising a plurality of signal storage registers, means for storing signals representative of data in said registers, status signal producing means for producing signals representative of the empty and full status of each of said registers, means for sensing said status signals successively in a repeated cycle, a receiver for signals representative of data, means providing data transfer control signals indicative of the readiness of the receiver to accept signals representative of data, and means responsive to each said control signal for translating to said receiver the data signals from the next succeeding register indicated as being full by the status signals produced by said status signal producing means and sensed by said sensing means.

2. A data storage system comprising a data signal source for producing signals representative of data, a plurality of signal storage registers, first and second status signal producing means for producing signals representative of the empty and full status of each of said signal storage registers, means for sensing said status signals successively in a repeated cycle, means responsive to each said status signal produced by said first status signal producing means which is representative of an empty register for translating signals produced by said data signal source to said empty register, a receiver for data signals representative of data, means providing data transfer control signals indicative of the readiness of the receiver to accept signals representative of data, and means responsive to each said control signal for translating to said receiver the data signals from the next succeeding register indicated as being full by the status signals produced by said second status signal producing means and sensed by said sensing means.

3. A magnetic drum data storage system comprising a data source for producing signals representative of data, a drum having a magnetizable surface including a plurality of circumferentially displaced data recording registers, status signal recording means for recording the empty and full status of each of said data recording registers, means for periodically sensing said status signals in repeated cycles, and writing means responsive to each recorded status signal which is representative of an empty register sensed by said sensing means during a said cycle for storing signals provided by said data source in each corresponding empty register.

4. A magnetic drum data storage system according to claim 3 which also includes means for causing said status signal recording means to record full status signals corresponding to each said register in which said data signals are stored by said writing means.

5. A magnetic drum data storage system according to claim 3 which also includes means for causing said status signal recording means to record empty status signals corresponding to each said empty register to which signals are not provided by said data source.

6. A magnetic drum data storage system comprising a drum having a magnetizable surface including a plurality of circumferentially displaced data signal recording registers, means for recording data signals in said registers, status signal recording means for recording the empty and full status of each of said data recording registers, means for periodically sensing said status signals, a receiver for said data signals, means for providing data transfer requirements control signals indicative of the readiness of the receiver to accept signals representative of data, and data transfer means responsive to each said control signal for transferring data signals to said receiver from the next succeeding register indicated as being full by the status signals recorded by said status signal recording means and sensed by said sensing means.

7. A magnetic drum data storage system according to claim 6 which also includes means for causing said status signal recording means to record an empty status signal corresponding to each data signal register caused to be transferred by said data transfer means.

8. A magnetic drum data storage system according to claim 6 which also includes means for causing said status signal recording means to record a full status signal corresponding to each said full register not caused to be transferred by said data transfer means.

9. A data storage system comprising a data signal source for producing signals representative of data, a plurality of signal storage registers, first and second status signal producing means for producing signals representative of the empty and full status of each of said data signal storage registers, means to sense said status signals periodically, means responsive to each said status signal produced by said first status signal producing means which is representative of an empty register for transferring signals produced by said data signal source to said empty register, means for causing said second status signal producing means to produce full status signals corresponding to each said register to which said data signals are transferred, a receiver for said data signals, means to provide data transfer control signals indicative of the readiness of said receiver to accept said data signals, means responsive to each said data transfer control signal and to the next succeeding second status signal sensed by said sensing means which is representative of a full register for transferring the data signals from said full register to said receiver, and means for causing said first status signal producing means to produce an empty status signal corresponding to said register from which said data signals are transferred to said receiver.

10. A magnetic drum data signal storage system comprising a data signal source, a drum having a magnetizable surface including a plurality of circumferentially spaced data recording registers, first and second status signal recording means for recording the empty and full status of each of said data recording registers, means for periodically sensing the status signals recorded by said first status signal recording means and for transferring data signals from said data signal source to each said data register indicated as being empty by the status signals recorded by said first status signal recording means, means for causing said second status signal recording means to record full status signals corresponding to each said register to which said data signals are transferred, a receiver for said data signals, means to provide data transfer control signals indicative of the readiness of said receiver to accept said data signals, means for periodically sensing the status signals recorded by said second status signal recording means and for transferring to the receiver upon the occurrence of each said data transfer signal the data signals from the next succeeding register indicated as being full by the status signals recorded by said second status signal recording means and sensed by said sensing means, and means for causing said first status signal recording means to record an empty status signal corresponding to each said data recording register from which said data signals have been transferred.

References Cited in the file of this patent

UNITED STATES PATENTS

| | | |
|---|---|---|
| 2,540,654 | Cohen et al. | Feb. 6, 1951 |
| 2,550,116 | Grosdoff | Apr. 24, 1951 |
| 2,551,104 | Dickinson | May 1, 1951 |
| 2,563,742 | Pfeiffer | Aug. 7, 1951 |
| 2,570,442 | Grosdoff | Oct. 9, 1951 |
| 2,614,169 | Cohen et al. | Oct. 14, 1952 |
| 2,698,427 | Steele | Dec. 28, 1954 |
| 2,713,676 | Fleming | July 19, 1955 |
| 2,817,072 | Chien et al. | Dec. 17, 1957 |

UNITED STATES PATENT OFFICE

CERTIFICATE OF CORRECTION

Patent No. 2,988,735 June 13, 1961

Robert R. Everett et al.

It is hereby certified that error appears in the above numbered patent requiring correction and that the said Letters Patent should read as corrected below.

Column 5, line 52, for "supplied" read -- applied --; column 6, line 37, for "pas" read -- pass --; line 56, strike out "be", first occurrence; column 9, line 12, strike out the comma and insert a closing parenthesis; same line 12, for "positice" read -- positive --; line 23, for "will" read -- full --; same column 9, line 33, for "on" read -- only --; column 10, line 20, strike out "the"; column 12, line 23, after "the", first occurrence, insert -- more --; column 13, line 20, for "20" read -- 220 --; line 46, strike out "to", second occurrence; same column 13, line 50, for "ocur" read -- occur --; column 25, line 72, for "31.2" read -- 21.2 --.

Signed and sealed this 17th day of April 1962.

(SEAL)
Attest:

ESTON G. JOHNSON
Attesting Officer

DAVID L. LADD
Commissioner of Patents